US012057059B2

(12) United States Patent

Koo et al.

(10) Patent No.: US 12,057,059 B2
(45) Date of Patent: *Aug. 6, 2024

(54) DISPLAY SUBSTRATE AND MOTHER SUBSTRATE FOR DISPLAY SUBSTRATE

(71) Applicant: SAMSUNG DISPLAY CO., LTD., Yongin-si (KR)

(72) Inventors: Bon-Yong Koo, Hwaseong-si (KR); Sujin Lee, Hwaseong-si (KR); Jaeyong Jang, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,950

(22) Filed: May 26, 2023

(65) Prior Publication Data

US 2023/0298515 A1 Sep. 21, 2023

Related U.S. Application Data

(63) Continuation of application No. 17/695,713, filed on Mar. 15, 2022, now Pat. No. 11,663,958.

(30) Foreign Application Priority Data

Sep. 24, 2021 (KR) ........................ 10-2021-0126461

(51) Int. Cl.
*G09G 3/32* (2016.01)

(52) U.S. Cl.
CPC ....... *G09G 3/32* (2013.01); *G09G 2320/0214* (2013.01)

(58) Field of Classification Search
CPC ......................... G09G 2320/0214; G09G 3/32
See application file for complete search history.

(56) References Cited

U.S. PATENT DOCUMENTS

2007/0001711 A1 1/2007 Kwak
2014/0354286 A1 12/2014 Kim
2020/0035136 A1 1/2020 Cho et al.
2021/0202663 A1 7/2021 Yang

FOREIGN PATENT DOCUMENTS

KR 10-0632680 B1 10/2006
KR 10-0858610 B1 9/2008
KR 10-1015312 B1 2/2011
KR 10-2011-0037638 A 4/2011
KR 10-2019-0084195 A 7/2019

*Primary Examiner* — Muhammad N Edun
(74) *Attorney, Agent, or Firm* — Lewis Roca Rothgerber Christie LLP

(57) ABSTRACT

A display substrate includes: a pixel circuit including: a switching transistor connected between a first terminal of a compensation capacitor and a data line; and a pixel transistor connected between a second terminal of the compensation capacitor and a first voltage line, the pixel transistor to receive a test voltage; and a test transistor including: a test gate terminal to receive a test signal; a test source terminal electrically connected to the first voltage line; and a test drain terminal electrically connected to the data line.

18 Claims, 37 Drawing Sheets

DISPLAY SUBSTRATE AND MOTHER SUBSTRATE FOR DISPLAY SUBSTRATE

CROSS-REFERENCE TO RELATED APPLICATIONS

This application is a continuation of U.S. patent application Ser. No. 17/695,713, filed Mar. 15, 2022, which claims priority to and the benefit of Korean Patent Application No. 10-2021-0126461, filed Sep. 24, 2021, the entire content of both of which is incorporated herein by reference.

BACKGROUND

1. Field

Aspects of embodiments of the present disclosure relate to a display substrate, and a mother substrate for a display substrate.

2. Discussion of the Background

In order to manufacture a display device, a display substrate is formed, and an array test is performed on the display substrate. The array test is a process of confirming whether transistors formed on the display substrate are normally formed. Recently, a circuit structure of a pixel circuit is becoming more complicated in order to realize a high-resolution display device, and thus, an array test of the pixel circuit that may be performed more accurately may be desired.

The above information disclosed in this Background section is for enhancement of understanding of the background of the present disclosure, and therefore, it may contain information that does not constitute prior art.

SUMMARY

One or more embodiments of the present disclosure are directed to a display substrate capable of an array test for transistors.

One or more embodiments of the present disclosure are directed to a mother substrate for a display substrate capable of an array test for transistors.

According to one or more embodiments of the present disclosure, a display substrate includes: a pixel circuit including: a switching transistor connected between a first terminal of a compensation capacitor and a data line; and a pixel transistor connected between a second terminal of the compensation capacitor and a first voltage line, the pixel transistor being configured to receive a test voltage; and a test transistor including: a test gate terminal configured to receive a test signal; a test source terminal electrically connected to the first voltage line; and a test drain terminal electrically connected to the data line.

In an embodiment, when a voltage level of the test voltage changes, a voltage level of a voltage received by the test source terminal may change.

In an embodiment, a voltage level of the test voltage may be greater than a voltage level of a first voltage of the first voltage line.

In an embodiment, the pixel transistor may include a first transistor including a source terminal connected to a first node, and a drain terminal connected to the first voltage line through a second node. The test voltage may include a second voltage, and the test source terminal may be configured to receive the second voltage through the first node, the second node, and the first voltage line.

In an embodiment, the pixel transistor may further include: a sixth transistor connected to the first node; a seventh transistor connected to the sixth transistor; and a ninth transistor connected between the second node and the first voltage line.

In an embodiment, the pixel transistor may further include: a third transistor connected to the first node; and a fourth transistor connected to the third transistor. The test voltage may further include a third voltage, and the test source terminal may be configured to receive the third voltage through the fourth transistor, the third transistor, the first node, the second node, and the first voltage line.

In an embodiment, the pixel transistor may further include an eighth transistor connected to the second node. The test voltage may further include a fourth voltage, and the test source terminal may be configured to receive the fourth voltage through the eighth transistor, the second node, and the first voltage line.

In an embodiment, the display substrate may further include a first voltage bus connected to the first voltage line, and the test source terminal may be directly connected to the first voltage bus.

In an embodiment, the first voltage bus may be located between the pixel circuit and the test transistor.

In an embodiment, the pixel transistor may include a first transistor including a source terminal connected to a first node, and a drain terminal connected to the first voltage line through a second node. The test voltage may include a second voltage, and the test source terminal may be configured to receive the second voltage through the second node, the first node, and the first voltage line.

In an embodiment, the pixel transistor may further include: a third transistor connected to the first node; and a fourth transistor connected to the third transistor. The test voltage may further include a third voltage, and the test source terminal may be configured to receive the third voltage through the fourth transistor, the third transistor, the first node, and the first voltage line.

In an embodiment, the pixel transistor may further include an eighth transistor connected to the second node. The test voltage may further include a fourth voltage, and the test source terminal may be configured to receive the fourth voltage through the eighth transistor, the second node, the first node, and the first voltage line.

In an embodiment, the pixel transistor may include a first transistor including a source terminal connected to the first voltage line through a first node, and a drain terminal connected to a second node. The test voltage may include a second voltage, and the test source terminal may be configured to receive the second voltage through the second node, the first node, and the first voltage line.

In an embodiment, the pixel transistor may further include: a sixth transistor connected to the first node; and a seventh transistor connected to the sixth transistor. The test voltage may further include a third voltage, and the test source terminal may be configured to receive the third voltage through the seventh transistor, the sixth transistor, the first node, and the first voltage line.

In an embodiment, the pixel transistor may further include an eighth transistor connected to the second node. The test voltage may further include a fourth voltage, and the test source terminal may be configured to receive the fourth voltage through the eighth transistor, the second node, the first node, and the first voltage line.

According to one or more embodiments of the present disclosure, a mother substrate includes: a cutting line; a display substrate located within the cutting line; and a test transistor located outside the cutting line. The display substrate includes a pixel circuit including: a switching transistor connected between a first terminal of a compensation capacitor and a data line; and a pixel transistor connected between a second terminal of the compensation capacitor and a first voltage line, the pixel transistor being configured to receive a test voltage. The test transistor includes: a test gate terminal configured to receive a test signal; a test source terminal electrically connected to the first voltage line; and a test drain terminal electrically connected to the data line.

In an embodiment, the test transistor may be electrically connected to the pixel circuit through a bridge pattern.

In an embodiment, the bridge pattern may include a conductive metal oxide.

According to one or more embodiments of the present disclosure, a display substrate may include a pixel circuit and a test transistor. The pixel circuit may include a compensation capacitor and a pixel transistor. The pixel transistor may be disconnected from a data line by the compensation capacitor. The test transistor may be electrically connected to the pixel transistor and the data line. Accordingly, it may be possible to perform the array test for the pixel transistor that is disconnected from the data line by the compensation capacitor.

It is to be understood that both the foregoing general description and the following detailed description are provided as examples, and are intended to provide some examples of the aspects and features of the present disclosure as claimed.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
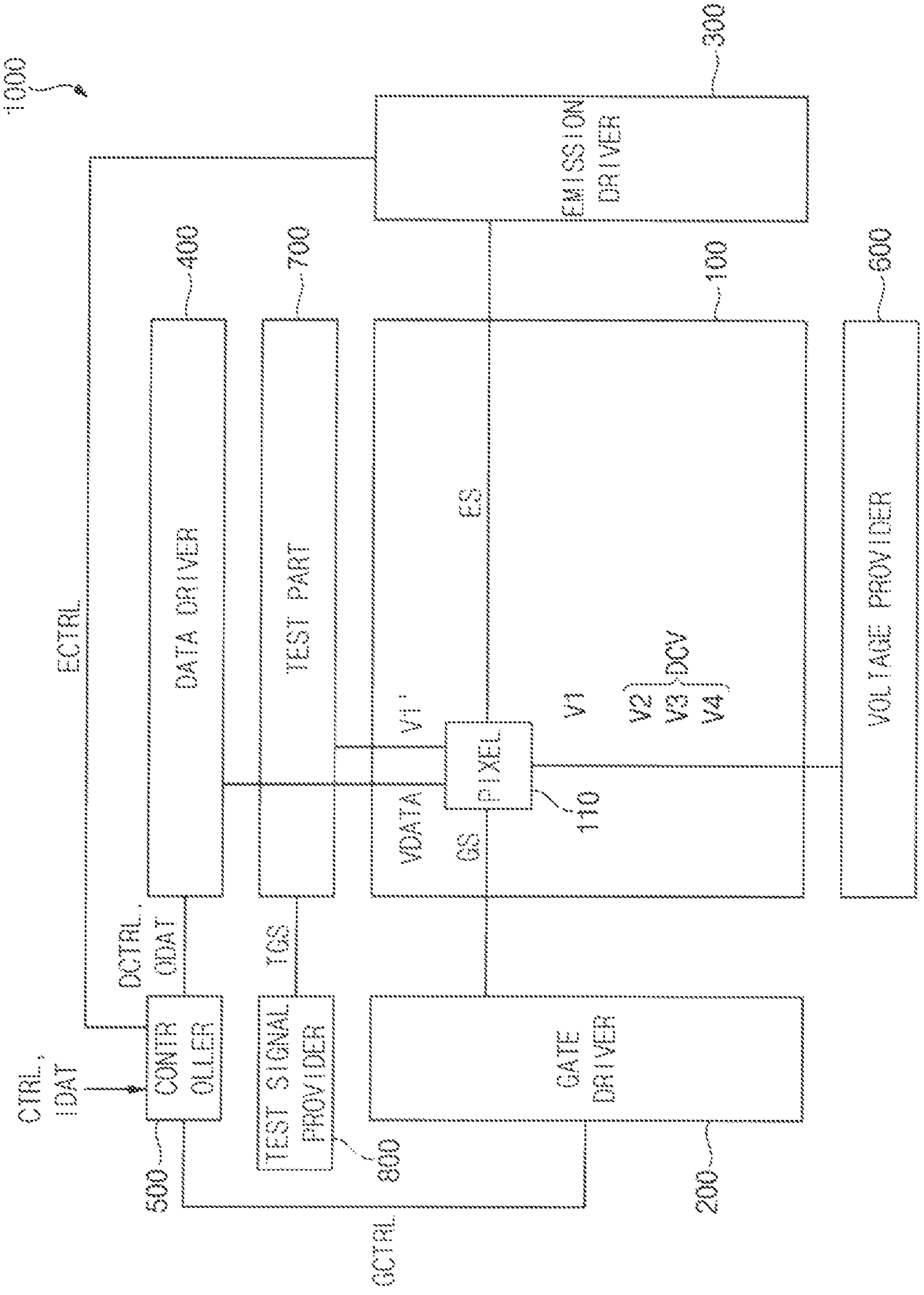
FIG. 1 is a block diagram illustrating a display substrate according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display substrate according to an embodiment.

Referring to FIG. 1, a display substrate 1000 according to an embodiment of the present disclosure may include a display panel 100, a gate driver 200, an emission driver 300, a data driver 400, a controller 500, a voltage provider 600, a test part 700, and a test signal provider 800.

The display panel 100 may include at least one pixel circuit 110. The pixel circuit 110 may be electrically connected to the gate driver 200, the emission driver 300, the data driver 400, the voltage provider 600, and the test part 700. Accordingly, the pixel circuit 110 may receive a gate signal GS, an emission signal ES, a data voltage VDATA, a first voltage V1, and a test voltage DCV. In addition, the pixel circuit 110 may transmit a test source voltage V1' to the test part 700.

The gate driver 200 may receive a gate control signal GCTRL from the controller 500. The gate driver 200 may generate the gate signal GS based on the gate control signal GCTRL. The gate signal GS may be provided to the pixel circuit 110 through a gate line.

The emission driver 300 may receive an emission control signal ECTRL from the controller 500. The emission driver 300 may generate the emission signal ES based on the emission control signal ECTRL. The emission signal ES may be provided to the pixel circuit 110 through an emission line.

The data driver 400 may receive a data control signal DCTRL and output image data ODAT from the controller 500. The data driver 400 may generate the data voltage VDATA based on the data control signal DCTRL and the output image data ODAT. The data voltage VDATA may be provided to the pixel circuit 110 through a data line.

The controller 500 may receive a control signal CTRL and input image data IDAT from an external device (e.g., a graphics processing unit (GPU)). The controller 500 may generate the gate control signal GCTRL, the emission control signal ECTRL, the data control signal DCTRL, and the output image data ODAT based on the control signal CTRL and the input image data IDAT.

The voltage provider 600 may provide the first voltage V1 and the test voltage DCV to the pixel circuit 110. In an embodiment, the test voltage DCV may include a second voltage V2, a third voltage V3, and a fourth voltage V4. The voltage provider 600 may change voltage levels of the first to fourth voltages V1, V2, V3, and V4. In an embodiment, all of the first to fourth voltages V1, V2, V3, and V4 provided from the voltage provider 600 may be DC voltages.

The test part 700 may include at least one test transistor. In an embodiment, the test transistor may be connected between the pixel circuit 110 and the data line. The test transistor may receive the test source voltage V1' from the pixel circuit 110. The test part 700 may perform an array test of the pixel circuit 110 based on the test source voltage V1'.

The test signal provider 800 may provide a test signal TGS to the test part 700. The test signal TGS may turn the test transistor on or off.

Figure 2:
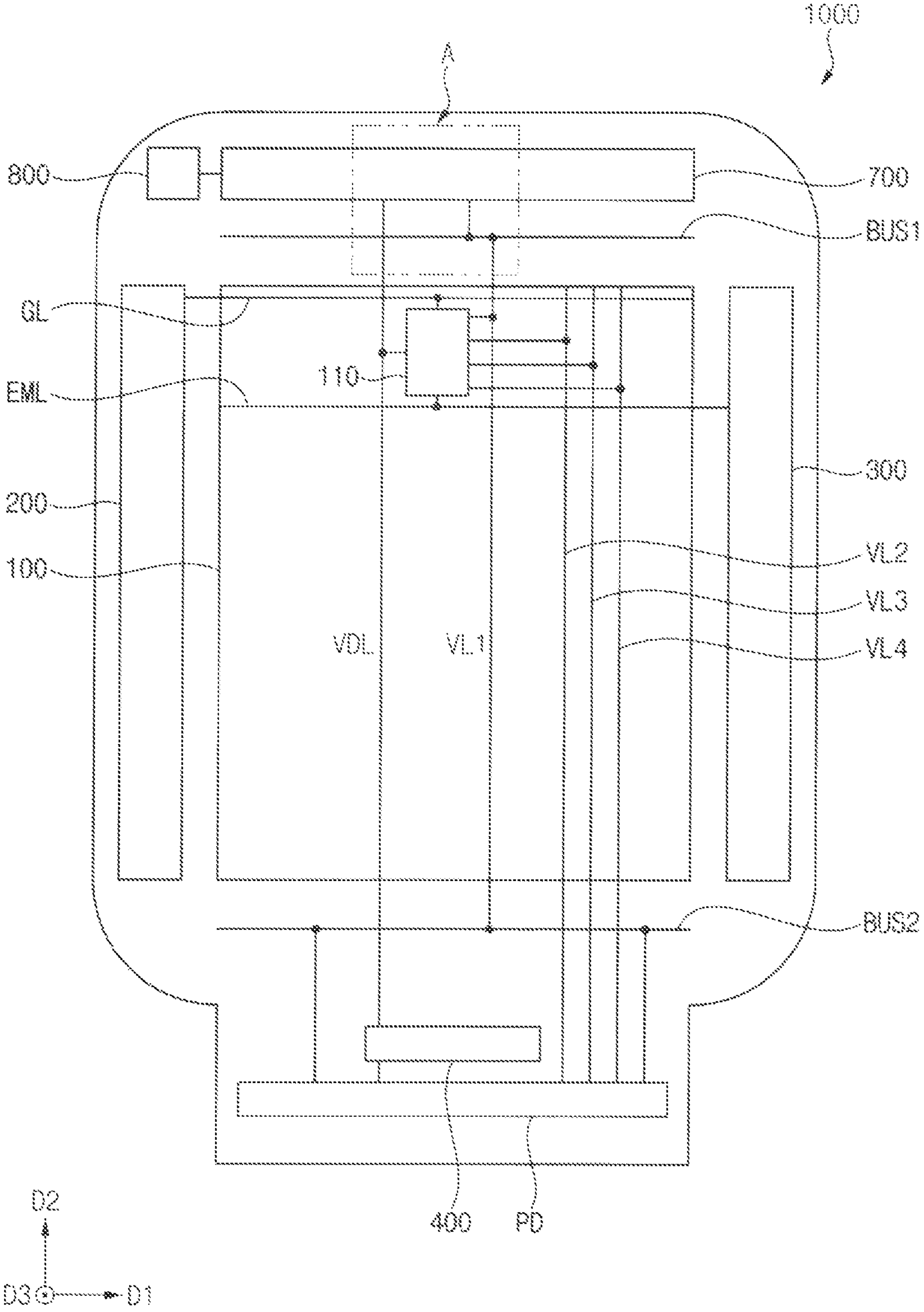
FIG. 2 is a plan view illustrating the display substrate of FIG. 1.
Figure 3:
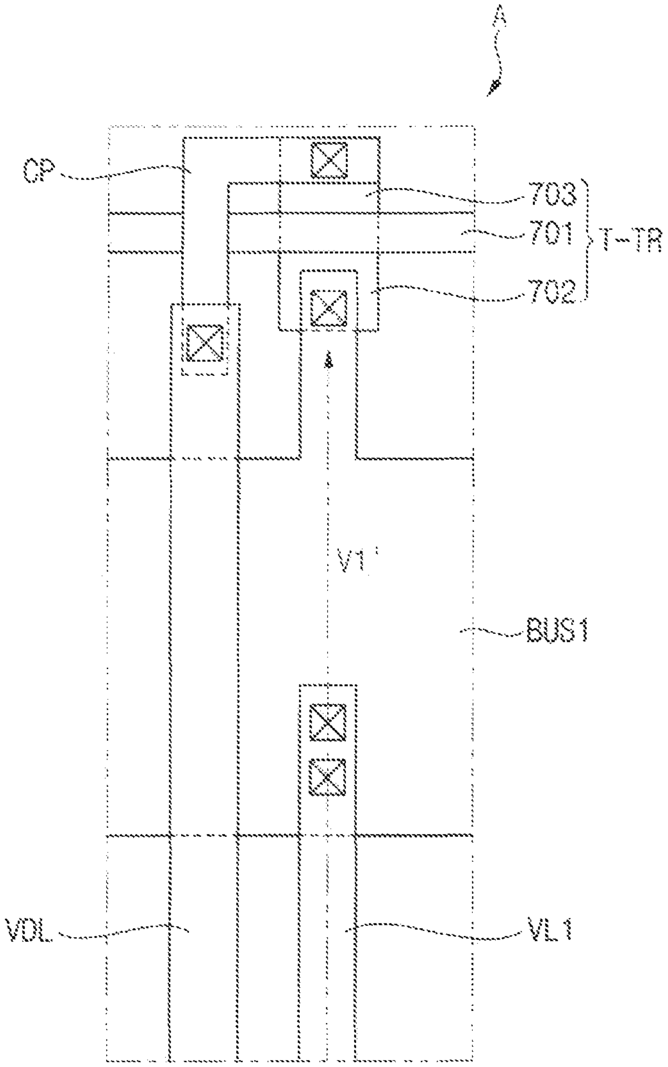
FIG. 3 is an enlarged view of the area A of FIG. 2.

FIG. 2 is a plan view illustrating the display substrate of FIG. 1. FIG. 3 is an enlarged view of the area A of FIG. 2.

Referring to FIG. 2, the gate driver 200 may be located on a left side of the display panel 100, and the emission driver 300 may be located on a right side of the display panel 100. The gate line GL may extend in a first direction D1, and may transmit the gate signal GS to the pixel circuit 110. The emission line EML may extend in the first direction D1, and may transmit the emission signal ES to the pixel circuit 110.

The data driver 400 may be located on a lower side of the display panel 100, and a pad part PD may be located on a lower side of the data driver 400. The data line VDL may extend in a second direction D2 crossing (e.g., perpendicular to or substantially perpendicular to) the first direction D1, and may transmit the data voltage VDATA to the pixel circuit 110. The pad part PD may be electrically connected to a printed circuit board. A first voltage line VL1, a second voltage line VL2, a third voltage line VL3, and a fourth voltage line VL4 may be connected to the pad part PD, and may transmit the first voltage V1, the second voltage V2, the third voltage V3, and the fourth voltage V4, respectively, to the pixel circuit 110.

The test part 700 may be located on an upper side of the display panel 100.

However, the positions of the components described above are not limited thereto. For example, the test part 700 may be located on the lower side of the display panel 100.

In an embodiment, the display substrate 1000 may further include a first voltage bus BUS1 and a second voltage bus BUS2. The first voltage bus BUS1 may be disposed between the test part 700 and the display panel 100. The first voltage bus BUS1 may be connected to (e.g., may be directly connected to) the first voltage line VL1, and may be connected to (e.g., may be directly connected to) the test transistor. The second voltage bus BUS2 may be disposed between the pad part PD and the display panel 100. The first voltage bus BUS1 and the second voltage bus BUS2 may prevent or substantially prevent a voltage drop of the first voltage V1.

Referring to FIG. 3, the test transistor T-TR may include a test gate terminal 701, a test source terminal 702, and a test drain terminal 703. The test gate terminal 701 may be connected to the test signal provider 800. The test source terminal 702 may be connected to (e.g., may be directly connected to) the first voltage bus BUS1 through a contact hole. The test drain terminal 703 may be connected to the data line VDL through a connection pattern CP. The test transistor T-TR may be turned on or off in response to the test signal TGS provided to the test gate terminal 701. In addition, the test source voltage V1' may be provided to the test source terminal 702. Accordingly, the test part 700 including the test transistor T-TR may perform the array test.

Figure 4:
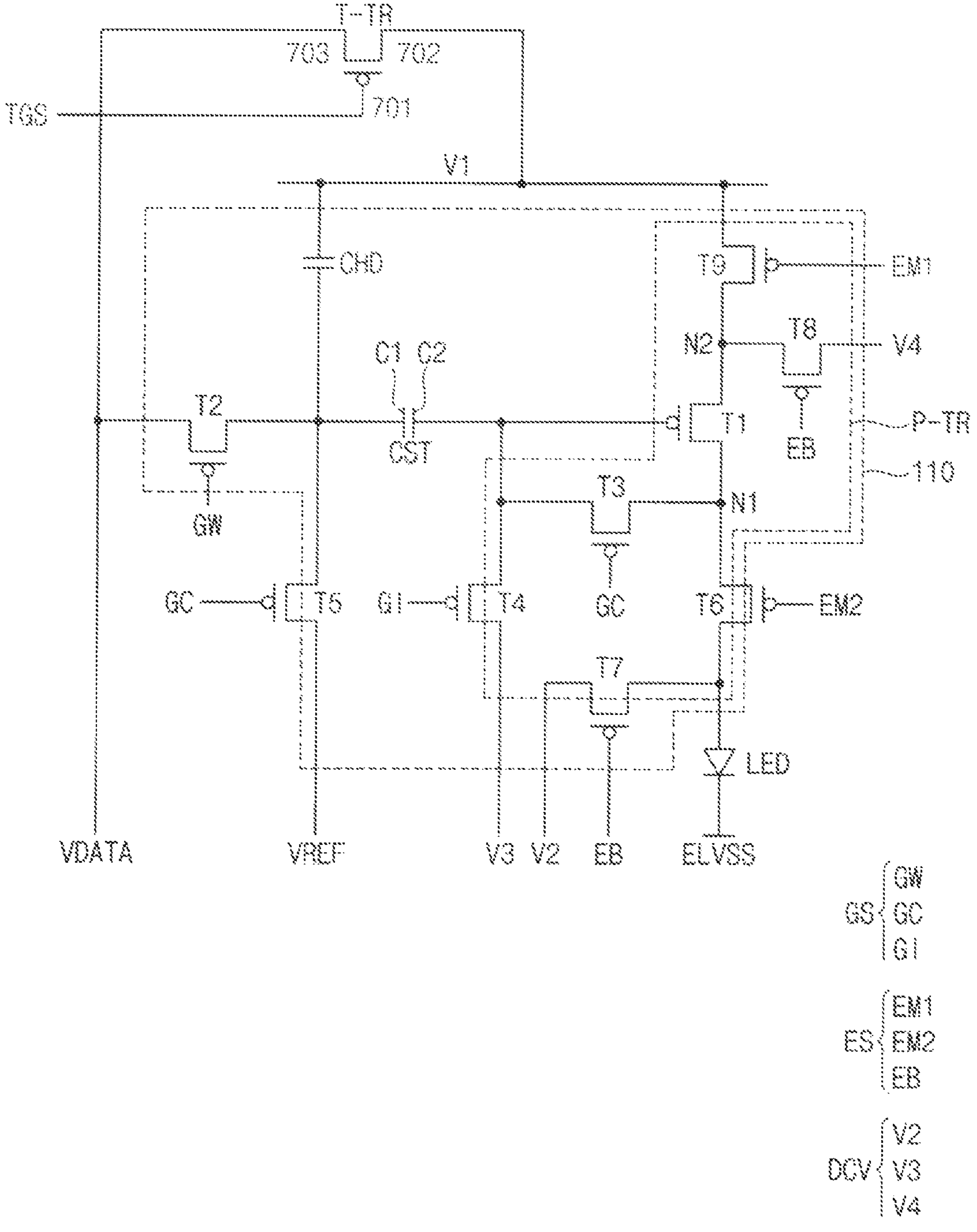
FIG. 4 is a circuit diagram illustrating the display substrate of FIG. 1.

FIG. 4 is a circuit diagram illustrating the display substrate of FIG. 1.

Referring to FIG. 4, the display substrate 1000 may include the pixel circuit 110 and the test transistor T-TR. The pixel circuit 110 may include a compensation capacitor CST, a holding capacitor CHD, a second transistor T2, a fifth transistor T5, and a pixel transistor P-TR.

In an embodiment, the pixel transistor P-TR may refer to a transistor for receiving the test voltage DCV. For example, the pixel transistor P-TR may include a first transistor T1, a third transistor T3, a fourth transistor T4, a sixth transistor T6, a seventh transistor T7, an eighth transistor T8, and a ninth transistor T9.

In an embodiment, the first to ninth transistors T1, T2, T3, T4, T5, T6, T7, T8, and T9 may be PMOS transistors. In addition, the test transistor T-TR may be a PMOS transistor. However, the present disclosure is not limited thereto.

The gate signal GS may include a first gate signal GW, a second gate signal GC, and a third gate signal GI. The emission signal ES may include a first emission signal EM1, a second emission signal EM2, and a third emission signal EB.

In an embodiment, the test voltage DCV may include the second voltage V2, the third voltage V3, and the fourth voltage V4.

The holding capacitor CHD may include a first terminal and a second terminal. The first terminal may receive the first voltage V1. The second terminal may be connected to the compensation capacitor CST. The holding capacitor CHD may maintain or substantially maintain a voltage level of the data voltage VDATA.

The compensation capacitor CST may include a first terminal C1 and a second terminal C2. The first terminal C1 may be connected to the second transistor T2. The second terminal C2 may be connected to a gate terminal of the first transistor T1. The compensation capacitor CST may compensate a threshold voltage of the first transistor T1.

The second transistor T2 may include a gate terminal, a first terminal, and a second terminal. The gate terminal may receive the first gate signal GW. The first terminal may receive the data voltage VDATA. The second terminal may be connected to the first terminal C1 of the compensation capacitor CST. The second transistor T2 may transfer the data voltage VDATA to the compensation capacitor CST. For example, the second transistor T2 may be referred to as a switching transistor T2. In other words, the switching transistor T2 may be connected between the first terminal C1 of the compensation capacitor CST and the data line VDL.

The fifth transistor T5 may include a gate terminal, a first terminal, and a second terminal. The gate terminal may receive the second gate signal GC. The first terminal may be connected to the first terminal C1 of the compensation capacitor CST. The second terminal may receive a reference voltage VREF.

The pixel transistor P-TR may receive the test voltage DCV. In addition, the pixel transistor P-TR may be connected between the second terminal C2 of the compensation capacitor CST and the first voltage line VL1.

The first transistor T1 may include a gate terminal, a source terminal, and a drain terminal. The gate terminal may be connected to the second terminal C2 of the compensation transistor CST. The source terminal may be connected to a first node N1. The drain terminal may receive the first voltage V1 through a second node N2. In other words, the drain terminal may be connected to the first voltage line VL1 through the second node N2. The first transistor T1 may generate a driving current based on a voltage difference between the second node N2 and the gate terminal of the first transistor T1.

The third transistor T3 may include a gate terminal, a first terminal, and a second terminal. The gate terminal may receive the second gate signal GC. The first terminal may be connected to the second terminal C2 of the compensation capacitor CST. The second terminal may be connected to the first node N1. In other words, the third transistor T3 may be connected between the gate terminal and the source terminal of the first transistor T1 to diode-connect the first transistor T1. The third transistor T3 may compensate for a threshold voltage of the first transistor T1.

The fourth transistor T4 may include a gate terminal, a first terminal, and a second terminal. The gate terminal may receive the third gate signal GI. The first terminal may be connected to the second terminal C2 of the compensation capacitor CST. The second terminal may receive the third voltage V3. The fourth transistor T4 may initialize the gate terminal of the first transistor T1 to the third voltage V3.

The sixth transistor T6 may include a gate terminal, a first terminal, and a second terminal. The gate terminal may receive the second emission signal EM2. The first terminal may be connected to the first node N1. The second terminal may be connected to the seventh transistor T7. The sixth transistor T6 may transmit the driving current to a light emitting diode LED.

The seventh transistor T7 may include a gate terminal, a first terminal, and a second terminal. The gate terminal may receive the third emission signal EB. The first terminal may be connected to the sixth transistor T6. The second terminal may receive the second voltage V2. The seventh transistor T7 may initialize the light emitting diode LED to the second voltage V2.

The eighth transistor T8 may include a gate terminal, a first terminal, and a second terminal. The gate terminal may receive the third emission signal EB. The first terminal may be connected to the second node N2. The second terminal may receive the fourth voltage V4. The eighth transistor T8 may suppress hysteresis of the first transistor T1.

The ninth transistor T9 may include a gate terminal, a first terminal, and a second terminal. The gate terminal may receive the first emission signal EM1. The first terminal may receive the first voltage V1. The second terminal may be connected to the second node N2. In other words, the ninth transistor T9 may be connected between the second node N2 and the first voltage line VL1. The ninth transistor T9 may transfer the first voltage V1 to the second node N2.

The test transistor T-TR may include the test gate terminal 701, the test source terminal 702, and the test drain terminal 703. The test gate terminal 701 may receive the test signal TGS. The test source terminal 702 may be connected to the first voltage line VL1. The test drain terminal 703 may be connected to the data line VDL.

The array test may be performed on the pixel circuit 110. The array test may be performed using the data line VDL. The array test may be performed while the second transistor T2 and the fifth transistor T5 change the voltage level of the reference voltage VREF.

In the pixel circuit 110, the pixel transistor P-TR may be electrically disconnected (e.g., electrically insulated) from the data line VDL by the compensation capacitor CST. In other words, the test voltage DCV provided to the pixel transistor P-TR is not transferred to the data line VDL due to a capacitance formed in the compensation capacitor CST, as there is no DC current flow path between the data line VDL and the pixel transistor P-TR through the compensation capacitor CST. Accordingly, it may be impossible to perform the array test on the pixel transistor P-TR in the pixel circuit 110.

However, in the case of the display substrate 1000, the array test of the pixel transistor P-TR may be performed through the test transistor T-TR, which may be formed outside the pixel circuit 110. In other words, the array test may be performed on the pixel transistor P-TR that is disconnected from the data line VDL by the compensation capacitor CST. This will be described in more detail below.

Figure 5:
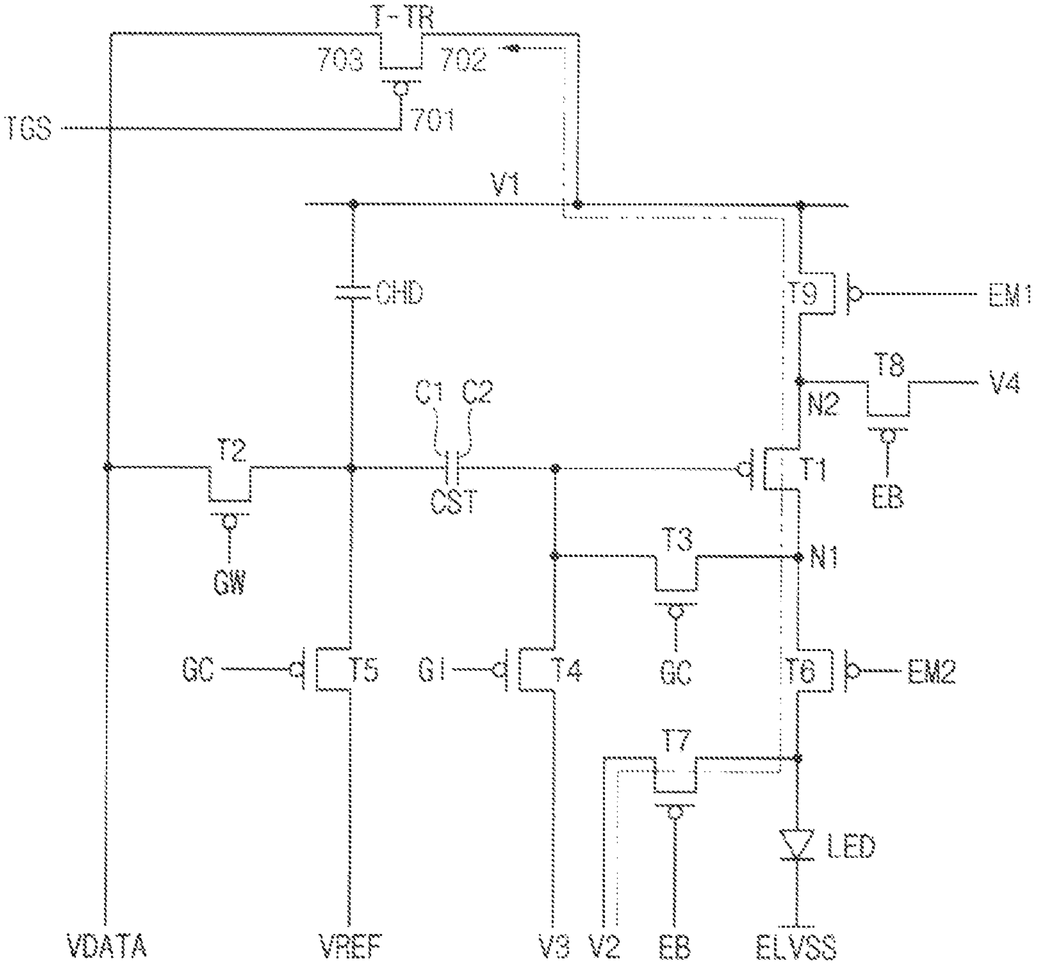
FIGS. 5-7 are circuit diagrams illustrating the display substrate of FIG. 4.
Figure 6:
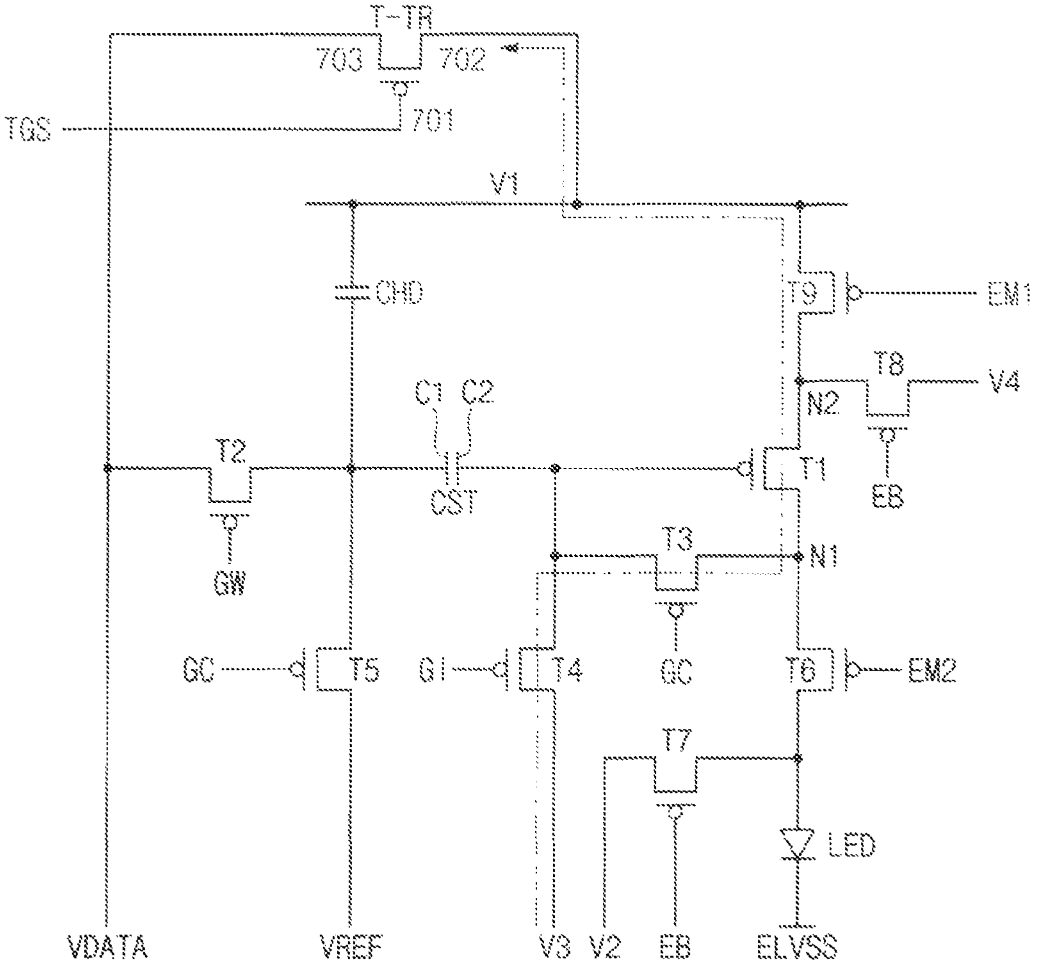
Figure 7:
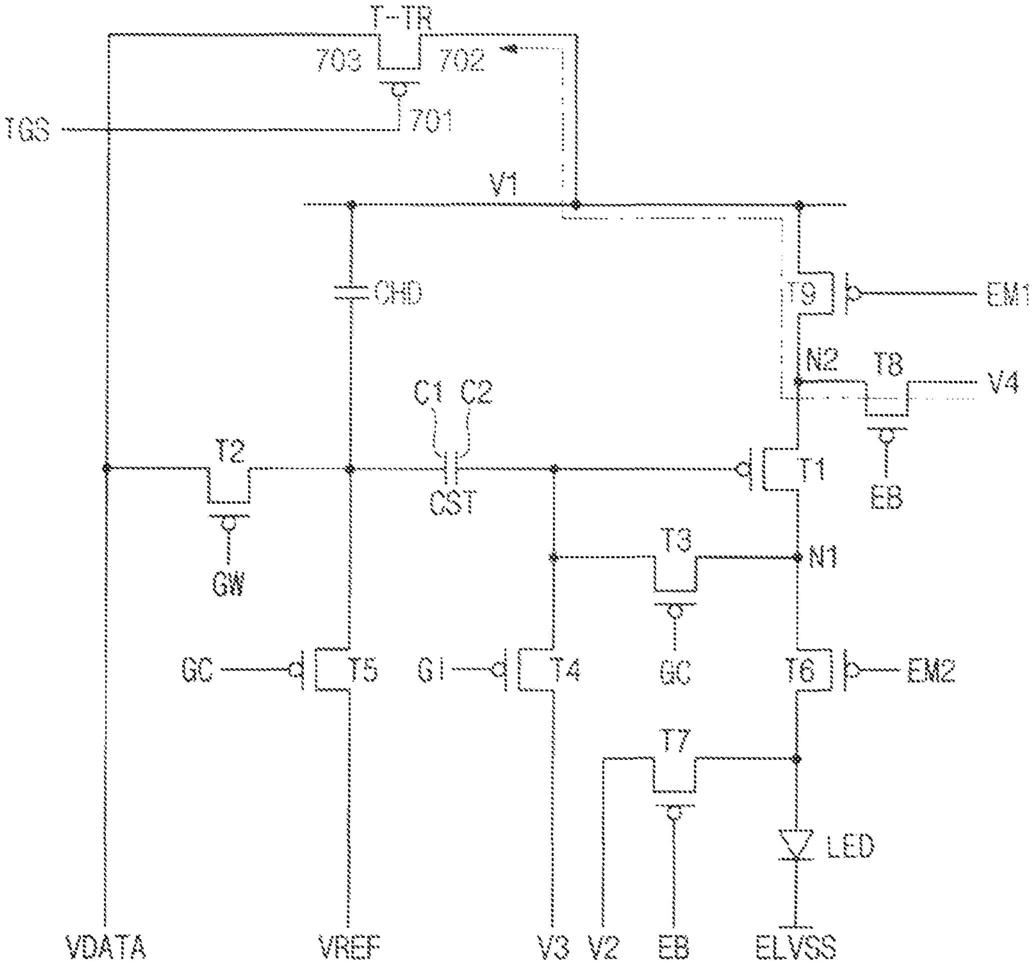

FIGS. 5 through 7 are circuit diagrams illustrating the display substrate of FIG. 4.

Referring to FIG. 5, the array test for the seventh transistor T7, the sixth transistor T6, the first transistor T1, and the ninth transistor T9 may be performed using the second voltage V2. In other words, the second voltage V2 may be transferred to the test source terminal 702 through the seventh transistor T7, the sixth transistor T6, the first node N1, the first transistor T1, the second node N2, the ninth transistor T9, and the first voltage line VL1.

In an embodiment, the voltage level of the second voltage V2 may be greater than the voltage level of the first voltage V1. Accordingly, the test source voltage V1' may be transferred to the test source terminal 702. For example, the test source voltage V1' may correspond to a voltage difference between the second voltage V2 and the first voltage V1. In other words, when the voltage level of the second voltage V2 is changed, the voltage level of the test source voltage V1' provided to the test source terminal 702 may be changed.

Referring to FIG. 6, the array test for the fourth transistor T4, the third transistor T3, the first transistor T1, and the ninth transistor T9 may be performed using the third voltage V3. In other words, the third voltage V3 may be transferred to the test source terminal 702 through the fourth transistor T4, the third transistor T3, the first node N1, the first transistor T1, the second node N2, the ninth transistor T9, and the first voltage line VL1.

In an embodiment, the voltage level of the third voltage V3 may be greater than the voltage level of the first voltage V1. Accordingly, the test source voltage V1' may be transferred to the test source terminal 702. For example, the test source voltage V1' may correspond to a voltage difference between the third voltage V3 and the first voltage V1.

Referring to FIG. 7, the array test for the eighth transistor T8 and the ninth transistor T9 may be performed using the fourth voltage V4. In other words, the fourth voltage V4 may be transferred to the test source terminal 702 through the eighth transistor T8, the second node N2, the ninth transistor T9, and the first voltage line VL1.

In an embodiment, the voltage level of the fourth voltage V4 may be greater than the voltage level of the first voltage V1. Accordingly, the test source voltage V1' may be transferred to the test source terminal 702. For example, the test source voltage V1' may correspond to a voltage difference between the fourth voltage V4 and the first voltage V1.

Figure 8:
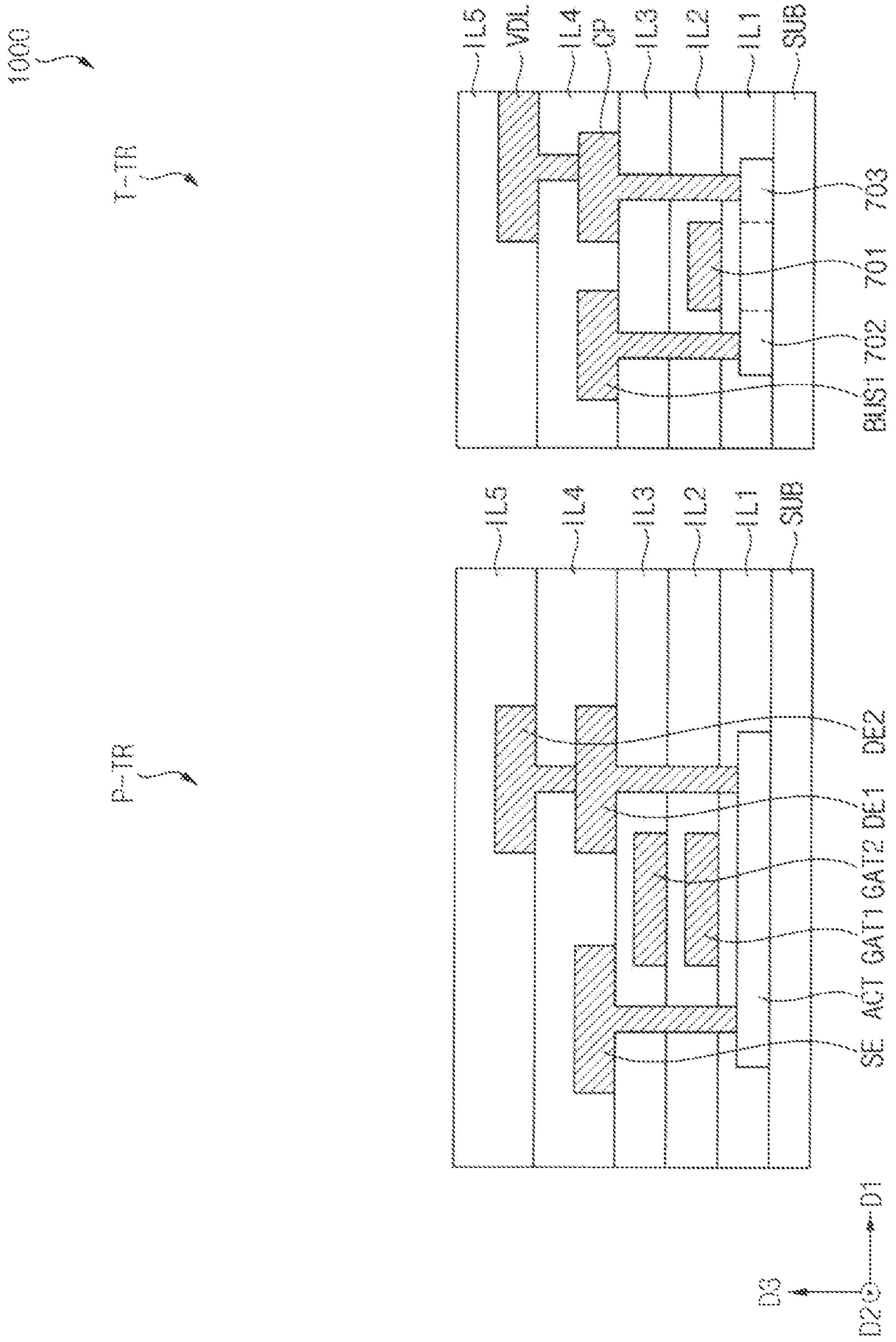
FIG. 8 is a cross-sectional view illustrating the display substrate of FIG. 1.

FIG. 8 is a cross-sectional view illustrating the display substrate of FIG. 1.

Referring to FIG. 8, the display substrate 1000 may include a substrate SUB, an active pattern ACT, a first insulating layer IL1, a first gate electrode GAT1, a second insulating layer IL2, a second gate electrode GAT2, a third insulating layer IL3, a source electrode SE, a first drain electrode DE1, a fourth insulating layer IL4, a second drain electrode DE2, and a fifth insulating layer IL5.

The substrate SUB may include a transparent or opaque material. For example, the substrate SUB may include glass, quartz, plastic, or the like.

The active pattern ACT may include a semiconductor material. For example, the active pattern ACT may include an oxide semiconductor material, a silicon semiconductor material, or the like. The silicon semiconductor material may include amorphous silicon, polycrystalline silicon, or the like.

The first insulating layer IL1 may cover the active pattern ACT, and may be disposed on the substrate SUB. The first insulating layer IL1 may include an organic insulating material, an inorganic insulating material, or the like. For example, the first insulating layer IL1 may include silicon oxide, silicon nitride, silicon oxynitride, or the like.

The first gate electrode GAT1 may be disposed on the first insulating layer IL1, and may overlap with the first active pattern ACT. The first gate electrode GAT1 may be formed of a metal, an alloy, a conductive metal oxide, a transparent conductive material, or the like. Examples of the material that may be used as the first gate electrode GAT1 may include silver ("Ag"), an alloy containing silver, molybdenum ("Mo"), an alloy containing molybdenum, aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), or the like. These materials may be used alone or in any suitable combinations with each other.

The second insulating layer IL2 may cover the first gate electrode GAT1, and may be disposed on the first insulating layer IL1. The second insulating layer IL2 may include an organic insulating material, an inorganic insulating material, or the like.

The second gate electrode GAT2 may be disposed on the second insulating layer IL2, and may overlap with the first gate electrode GAT1. The second gate electrode GAT2 may be formed of a metal, an alloy, a conductive metal oxide, a transparent conductive material, or the like.

The third insulating layer IL3 may cover the second gate electrode GAT2, and may be disposed on the second insulating layer IL2. The third insulating layer IL3 may include an organic insulating material, an inorganic insulating material, or the like.

The source electrode SE and the first drain electrode DE1 may be disposed on the third insulating layer IL3, and may contact the active pattern ACT. The source electrode SE and the first drain electrode DE1 may be formed of a metal, an alloy, a conductive metal oxide, a transparent conductive material, or the like.

The fourth insulating layer IL4 may cover the source electrode SE and the first drain electrode DE1, and may be disposed on the third insulating layer IL3. The fourth insulating layer IL4 may include an organic insulating material, an inorganic insulating material, or the like. For example, the fourth insulating layer IL4 may include a photoresist, polyacrylic resin, polyimide resin, acrylic resin, or the like.

The second drain electrode DE2 may be disposed on the fourth insulating layer IL4, and may contact the first drain electrode DE1. The second drain electrode DE2 may be formed of a metal, an alloy, a conductive metal oxide, a transparent conductive material, or the like.

The fifth insulating layer IL5 may cover the second drain electrode DE2, and may be disposed on the fourth insulating layer IL4. The fifth insulating layer IL5 may include an organic insulating material, an inorganic insulating material, or the like.

The test source terminal 702 and the test drain terminal 703 of the test transistor T-TR may be formed together with (e.g., concurrently or simultaneously with) the active pattern ACT.

The test gate terminal 701 may be formed together with (e.g., concurrently or simultaneously with) the first gate electrode GAT1.

The first voltage bus BUS1 and the connection pattern CP may be formed together with (e.g., concurrently or simultaneously with) the source electrode SE and the first drain electrode DE1. The first voltage bus BUS1 may contact the test source terminal 702, and the connection pattern CP may contact the test drain terminal 703.

The data line VDL may be integrally formed with the second drain electrode DE2, and may contact the connection pattern CP.

Figure 9:
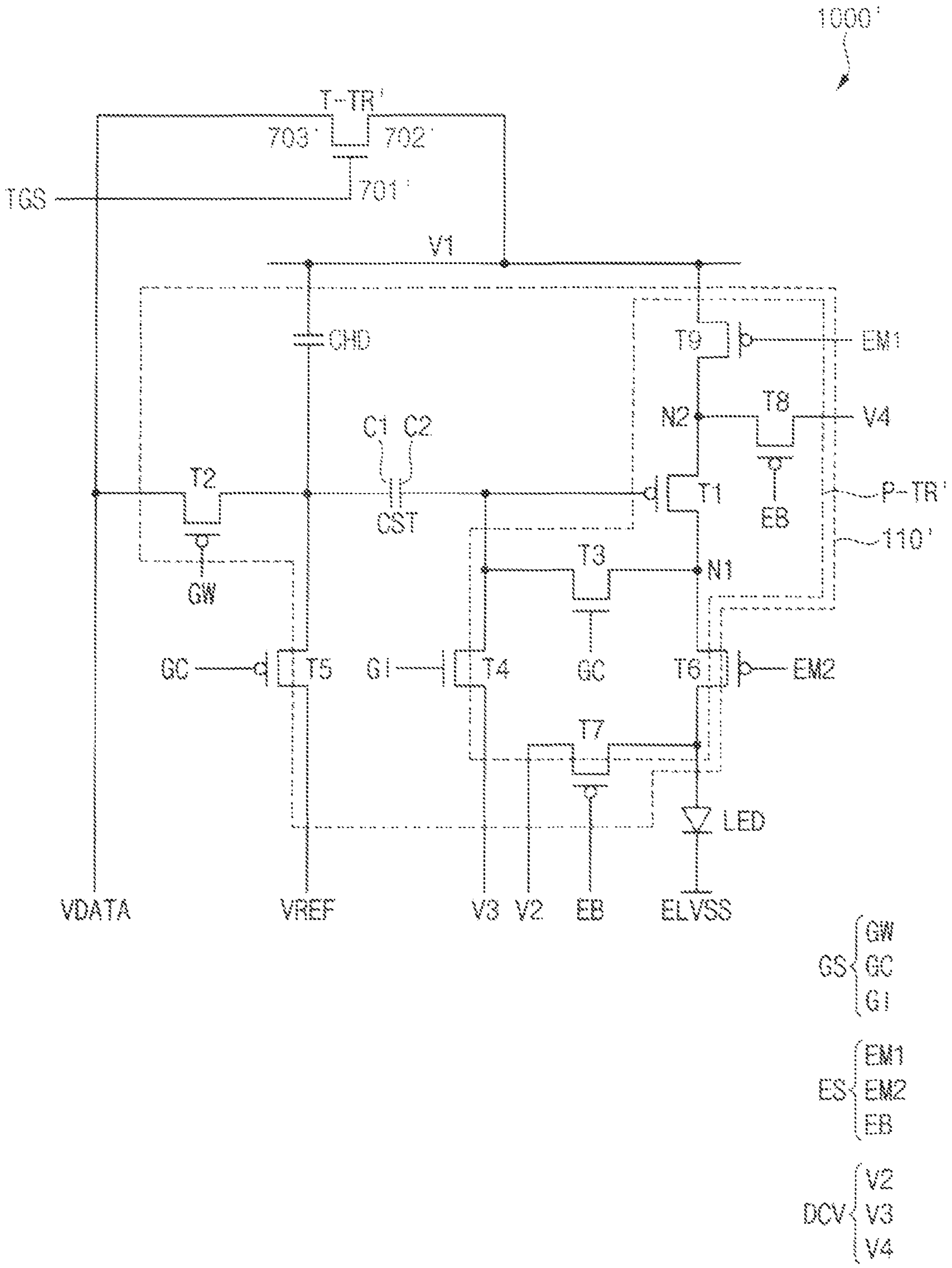
FIG. 9 is a circuit diagram illustrating a display substrate according to another embodiment.

FIG. 9 is a circuit diagram illustrating a display substrate according to another embodiment.

Referring to FIG. 9, a display substrate 1000' according to another embodiment may be the same or substantially the same as (or similar to) the display substrate 1000 described above, except that a third transistor T3, a fourth transistor T4, and a test transistor T-TR' thereof may be different. Accordingly, the differences therebetween may be mainly described hereinafter, and redundant description thereof may be simplified or may not be repeated.

In an embodiment, the third transistor T3, the fourth transistor T4, and the test transistor T-TR' may be NMOS transistors. In addition, the first, second, fifth, sixth, seventh, eighth, and ninth transistors T1, T2, T5, T6, T7, T8, and T9 may be PMOS transistors.

Figure 10:
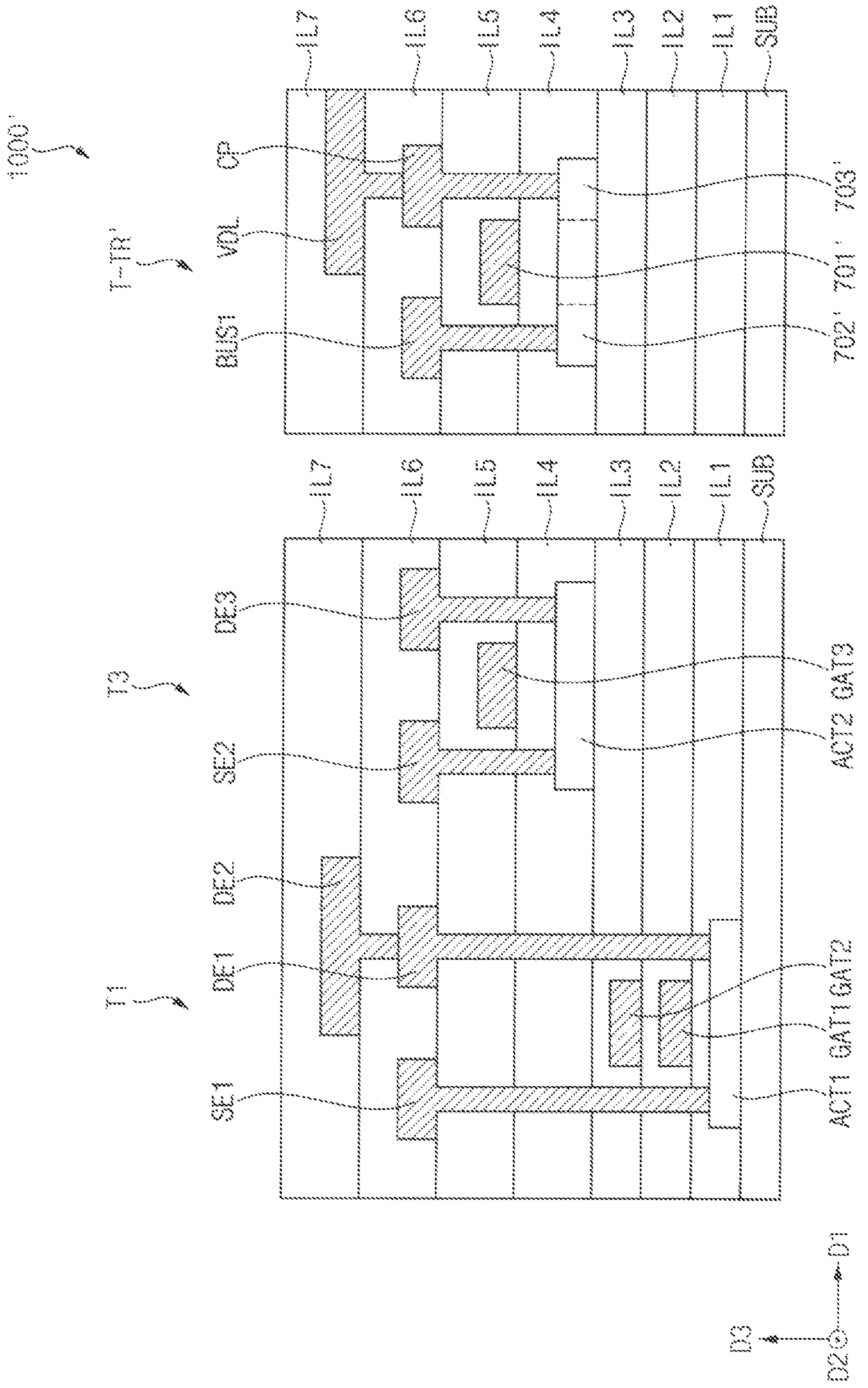
FIG. 10 is a cross-sectional view illustrating the display substrate of FIG. 9.

FIG. 10 is a cross-sectional view illustrating the display substrate of FIG. 9.

Referring to FIG. 10, the display substrate 1000' may include the substrate SUB, a first active pattern ACT1, the first insulating layer IL1, the first gate electrode GAT1, the second insulating layer IL2, the second gate electrode GAT2, the third insulating layer IL3, a second active pattern ACT2, a fourth insulating layer IL4, a third gate electrode GAT3, a fifth insulating layer IL5, a first source electrode SE1, a first drain electrode DE1, a second source electrode SE2, a third drain electrode DE3, a sixth insulating layer IL6, the second drain electrode DE2, and a seventh insulating layer IL7.

The first active pattern ACT1 may include amorphous silicon, polycrystalline silicon, or the like.

The second active pattern ACT2 may be disposed on the third insulating layer IL3, and may include a semiconductor material. For example, the second active pattern ACT2 may include an oxide semiconductor material. Examples of the oxide semiconductor material may include IGZO (InGaZnO), ITZO (InSnZnO), and the like.

The third gate electrode GAT3 may be disposed on the fourth insulating layer IL4, and may overlap with the second active pattern ACT2. The third gate electrode GAT3 may be formed of a metal, an alloy, a conductive metal oxide, a transparent conductive material, or the like.

The second source electrode SE2 and the third drain electrode DE3 may be disposed on the fifth insulating layer IL5, and may contact the second active pattern ACT2. The second source electrode SE2 and the third drain electrode DE3 may be formed of a metal, an alloy, a conductive metal oxide, a transparent conductive material, or the like.

The test source terminal 702' and the test drain terminal 703' of the test transistor T-TR' may be formed together with (e.g., concurrently or simultaneously with) the second active pattern ACT2.

The test gate terminal 701' may be formed together with (e.g., concurrently or simultaneously with) the third gate electrode GAT3.

The first voltage bus BUS1 and the connection pattern CP may be formed together with (e.g., concurrently or simultaneously with) the second source electrode SE2 and the third drain electrode DE3. The data line VDL may be integrally formed with the second drain electrode DE2, and may contact the connection pattern CP.

As the test transistor T-TR' is formed of an oxide semiconductor, a current leakage phenomenon of the test transistor T-TR' may be prevented or reduced.

Figure 11:
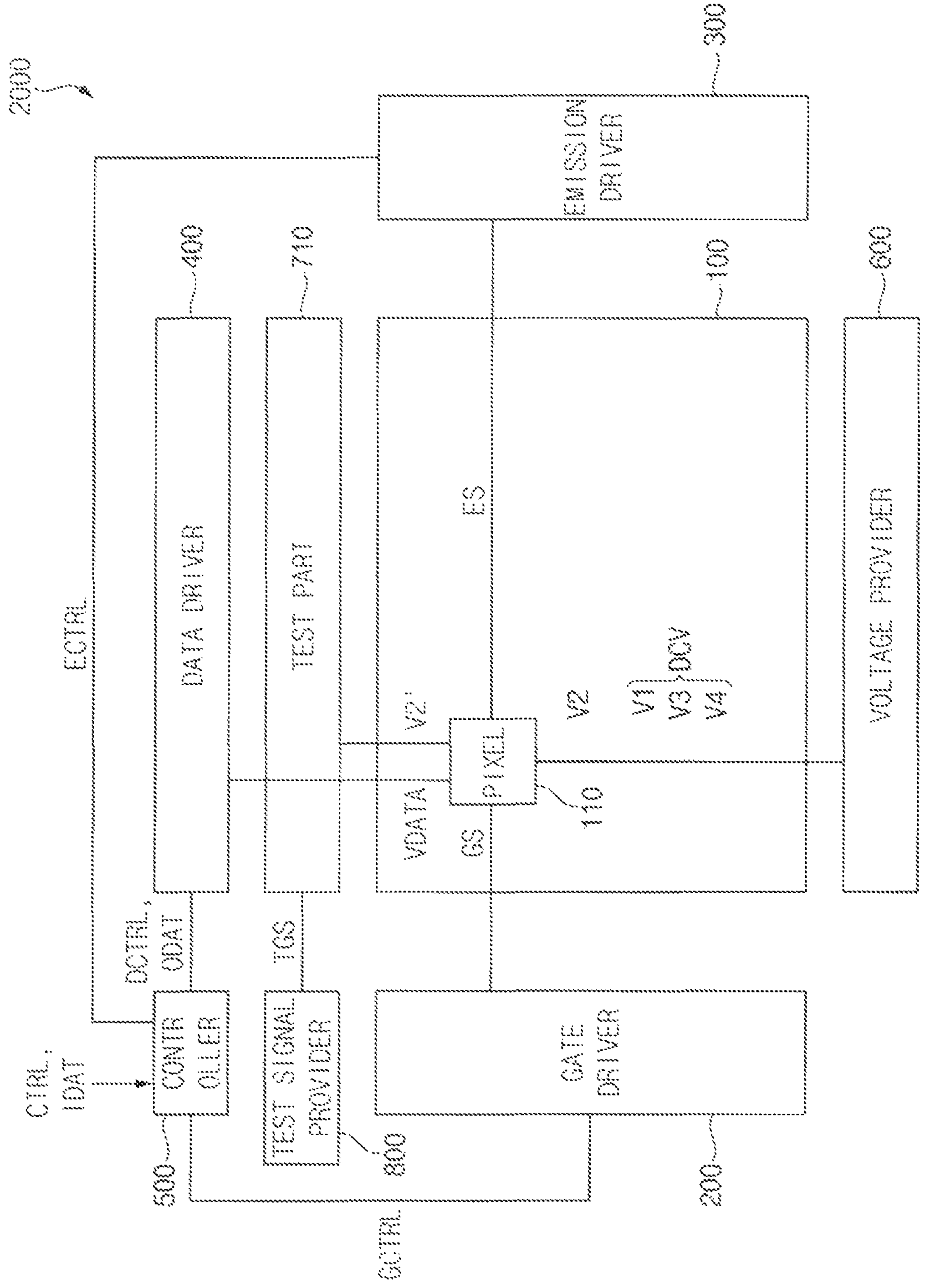
FIG. 11 is a block diagram illustrating a display substrate according to another embodiment.

FIG. 11 is a block diagram illustrating a display substrate according to another embodiment.

Referring to FIG. 11, a display substrate 2000 according to another embodiment may include a display panel 100, a gate driver 200, an emission driver 300, a data driver 400, a controller 500, a voltage provider 600, a test part 710, and a test signal provider 800. The display panel 100 may include at least one pixel circuit 110.

The display substrate 2000 may be the same or substantially the same as (or similar to) the display substrate 1000 described above, except that a connection structure between the pixel circuit 110 and the test part 710 may be different.

Accordingly, the differences therebetween may be mainly described hereinafter, and redundant description thereof may be simplified or may not be repeated.

Figure 12:
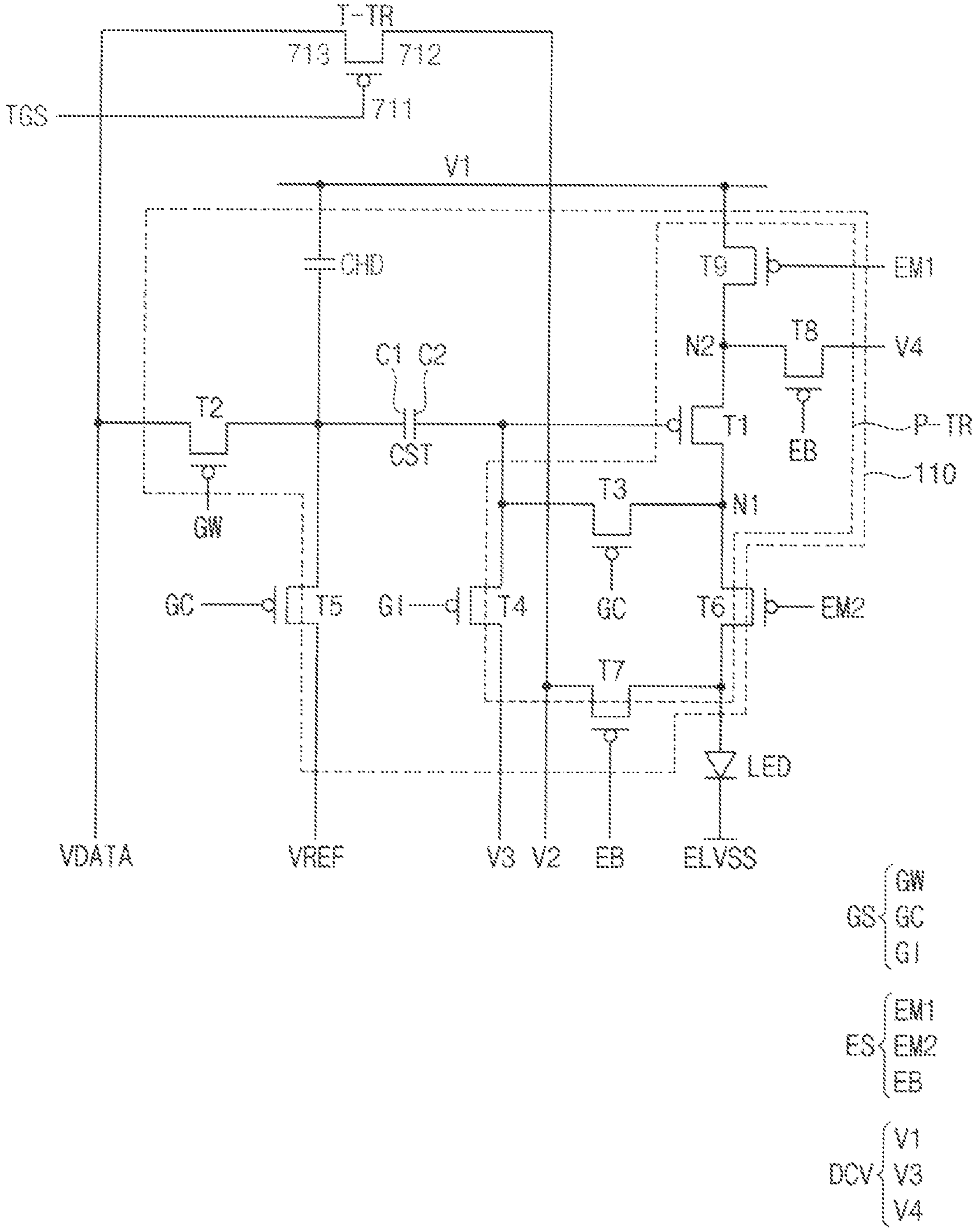
FIG. 12 is a circuit diagram illustrating the display substrate of FIG. 11.

FIG. 12 is a circuit diagram illustrating the display substrate of FIG. 11.

Referring to FIG. 12, the display substrate 2000 may include the pixel circuit 110 and a test transistor T-TR. The pixel circuit 110 may include the compensation capacitor CST, the holding capacitor CHD, the second transistor T2, the fifth transistor T5, and the pixel transistor P-TR. However, the circuit structure of the pixel circuit 110 may be the same or substantially the same as the circuit structure of the pixel circuit 110 described above with reference to FIG. 4.

In an embodiment, the test voltage DCV may include the first voltage V1, the third voltage V3, and the fourth voltage V4.

The test transistor T-TR may include a test gate terminal 711, a test source terminal 712, and a test drain terminal 713. The test gate terminal 711 may receive the test signal TGS. The test source terminal 712 may be connected to the second voltage line VL2 to receive the second voltage V2. The test drain terminal 713 may be connected to the data line VDL.

In the case of the display substrate 2000, the array test of the pixel transistor P-TR may be performed through the test transistor T-TR, which may be formed outside the pixel circuit 110. In other words, the array test may be performed on the pixel transistor P-TR that is disconnected from the data line VDL by the compensation capacitor CST. This will be described in more detail below.

Figure 13:
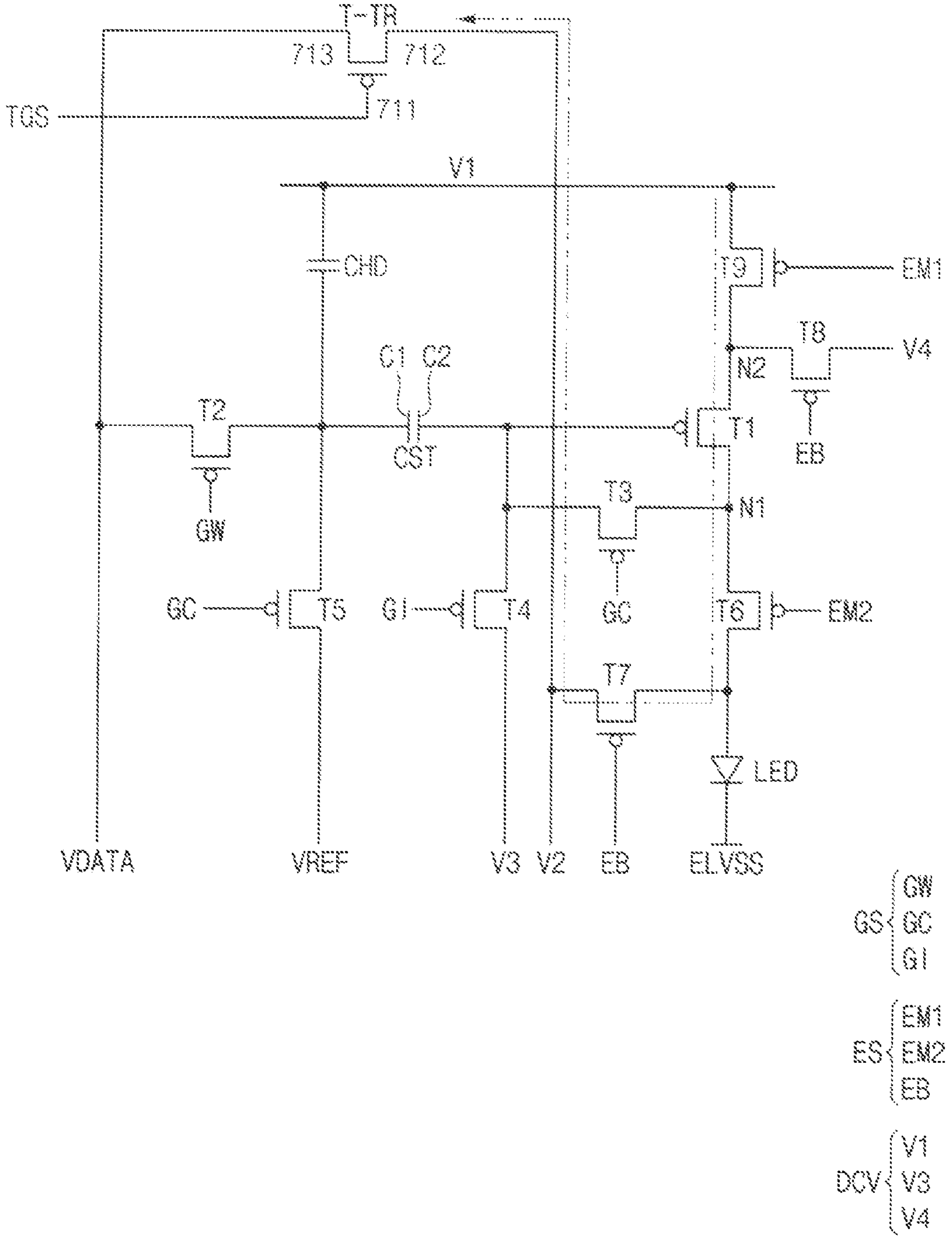
FIGS. 13-15 are circuit diagrams illustrating the display substrate of FIG. 12.
Figure 14:
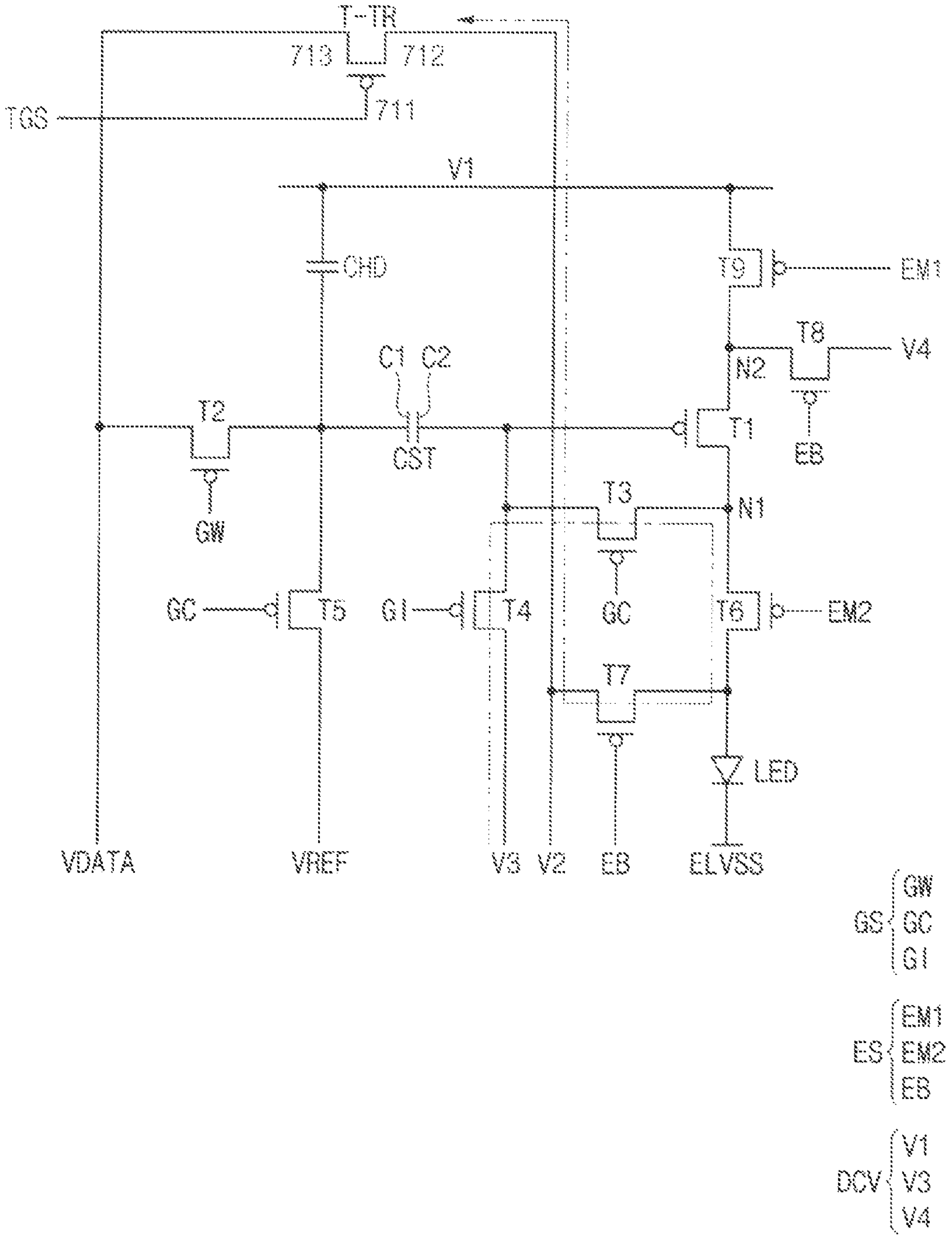
Figure 15:
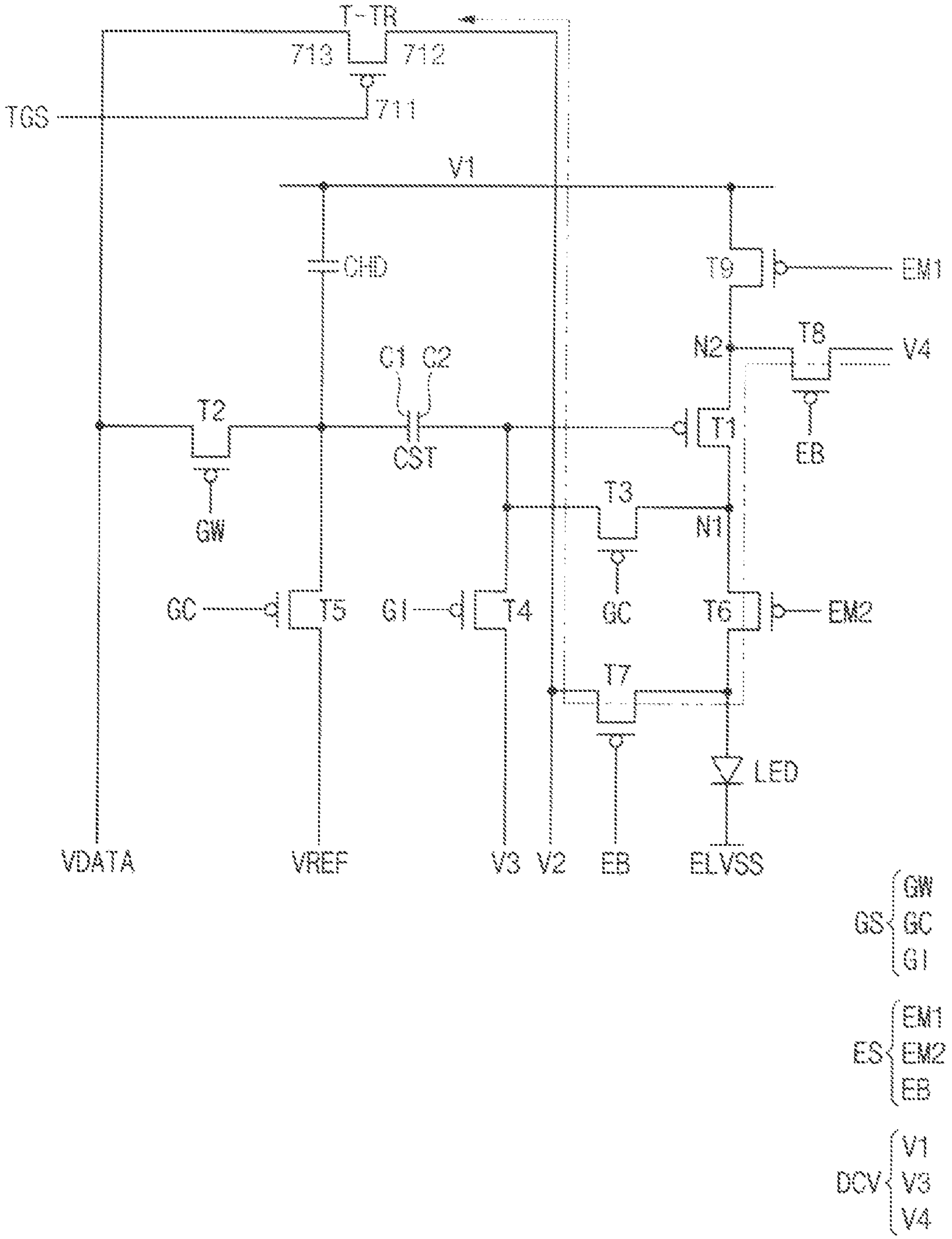

FIGS. 13 through 15 are circuit diagrams illustrating the display substrate of FIG. 12.

Referring to FIG. 13, the array test for the ninth transistor T9, the first transistor T1, the sixth transistor T6, and the seventh transistor T7 may be performed using the first voltage V1. In other words, the first voltage V1 may be transferred to the test source terminal 712 through the ninth transistor T9, the second node N2, the first transistor T1, the first node N1, the sixth transistor T6, the seventh transistor T7, and the second voltage line VL2.

In an embodiment, the voltage level of the first voltage V1 may be greater than the voltage level of the second voltage V2. Accordingly, the test source voltage V2' may be transferred to the test source terminal 712. For example, the test source voltage V2' may correspond to a voltage difference between the first voltage V1 and the second voltage V2.

Referring to FIG. 14, the array test for the fourth transistor T4, the third transistor T3, the sixth transistor T6, and the seventh transistor T7 may be performed using the third voltage V3. In other words, the third voltage V3 may be transferred to the test source terminal 712 through the fourth transistor T4, the third transistor T3, the first node N1, the sixth transistor T6, the seventh transistor T7, and the second voltage line VL2.

In an embodiment, the voltage level of the third voltage V3 may be greater than the voltage level of the second voltage V2. Accordingly, the test source voltage V2' may be transferred to the test source terminal 712. For example, the test source voltage V2' may correspond to a voltage difference between the third voltage V3 and the second voltage V2.

Referring to FIG. 15, the array test for the eighth transistor T8, the first transistor T1, the sixth transistor T6, and the seventh transistor T7 may be performed using the fourth voltage V4. In other words, the fourth voltage V4 may be transferred to the test source terminal 712 through the eighth transistor T8, the second node N2, the first transistor T1, the first node N1, the sixth transistor T6, the seventh transistor T7, and the second voltage line VL2.

In an embodiment, the voltage level of the fourth voltage V4 may be greater than the voltage level of the second voltage V2. Accordingly, the test source voltage V2' may be transferred to the test source terminal 712. For example, the test source voltage V2' may correspond to a voltage difference between the fourth voltage V4 and the second voltage V2.

Figure 16:
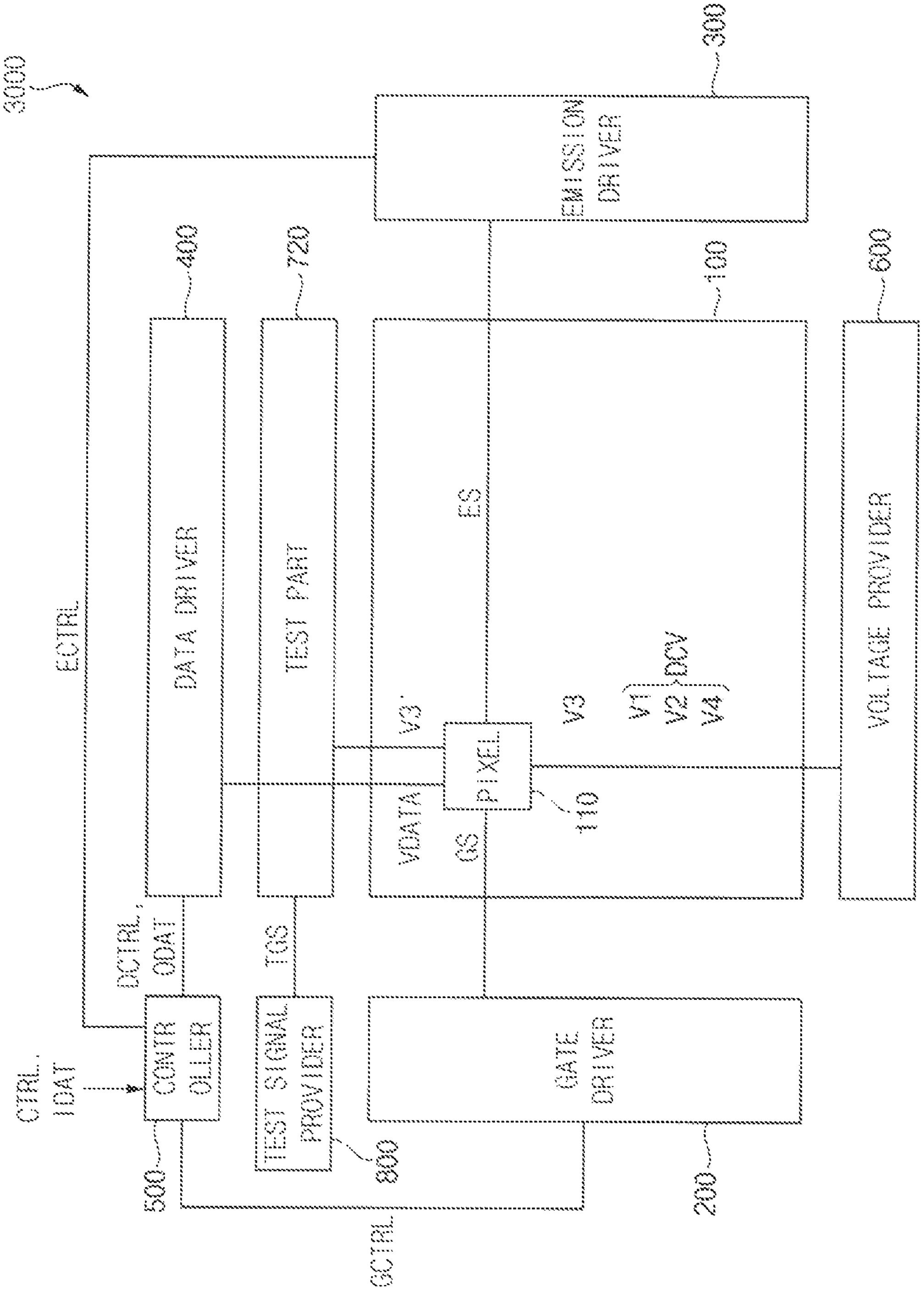
FIG. 16 is a block diagram illustrating a display substrate according to another embodiment.

FIG. 16 is a block diagram illustrating a display substrate according to another embodiment.

Referring to FIG. 16, a display substrate 3000 according to another embodiment may include a display panel 100, a gate driver 200, an emission driver 300, a data driver 400, a controller 500, a voltage provider 600, a test part 720, and a test signal provider 800. The display panel 100 may include at least one pixel circuit 110.

The display substrate 3000 may be the same or substantially the same as (or similar to) the display substrate 1000 described above, except that a connection structure between the pixel circuit 110 and the test part 720 may be different. Accordingly, the differences therebetween may be mainly described hereinafter, and redundant description thereof may be simplified or may not be repeated.

Figure 17:
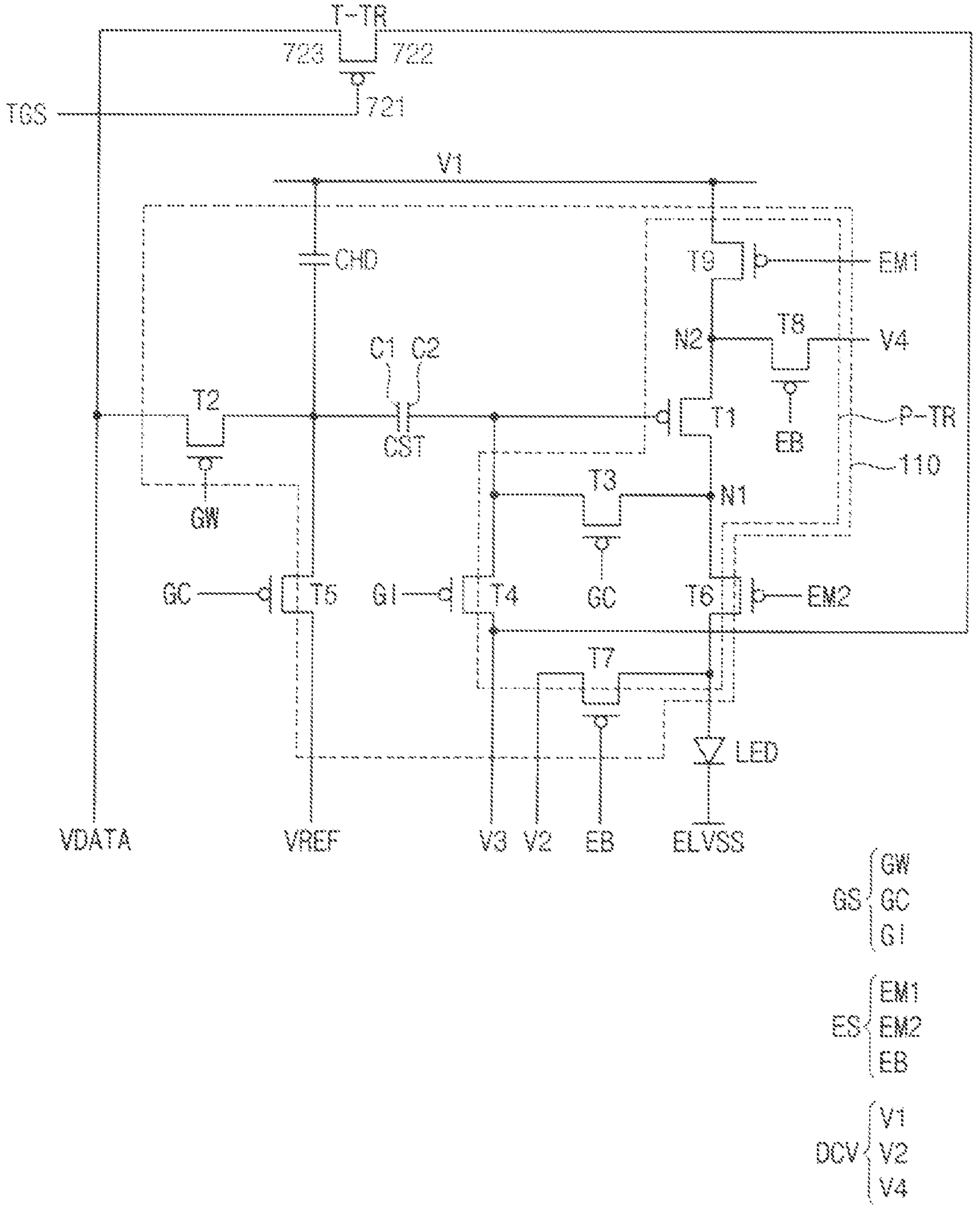
FIG. 17 is a circuit diagram illustrating the display substrate of FIG. 16.

FIG. 17 is a circuit diagram illustrating the display substrate of FIG. 16.

Referring to FIG. 17, the display substrate 3000 may include the pixel circuit 110 and a test transistor T-TR. The pixel circuit 110 may include the compensation capacitor CST, the holding capacitor CHD, the second transistor T2, the fifth transistor T5, and the pixel transistor P-TR. However, the circuit structure of the pixel circuit 110 may be the same or substantially the same as the circuit structure of the pixel circuit 110 described above with reference to FIG. 4.

In an embodiment, the test voltage DCV may include the first voltage V1, the second voltage V2, and the fourth voltage V4.

The test transistor T-TR may include a test gate terminal 721, a test source terminal 722, and a test drain terminal 723. The test gate terminal 721 may receive the test signal TGS. The test source terminal 722 may be connected to the third voltage line VL3 to receive the third voltage V3. The test drain terminal 723 may be connected to the data line VDL.

In the case of the display substrate 3000, the array test of the pixel transistor P-TR may be performed through the test transistor T-TR, which may be formed outside the pixel circuit 110. In other words, the array test may be performed on the pixel transistor P-TR that is disconnected from the data line VDL by the compensation capacitor CST. This will be described in more detail below.

Figure 18:
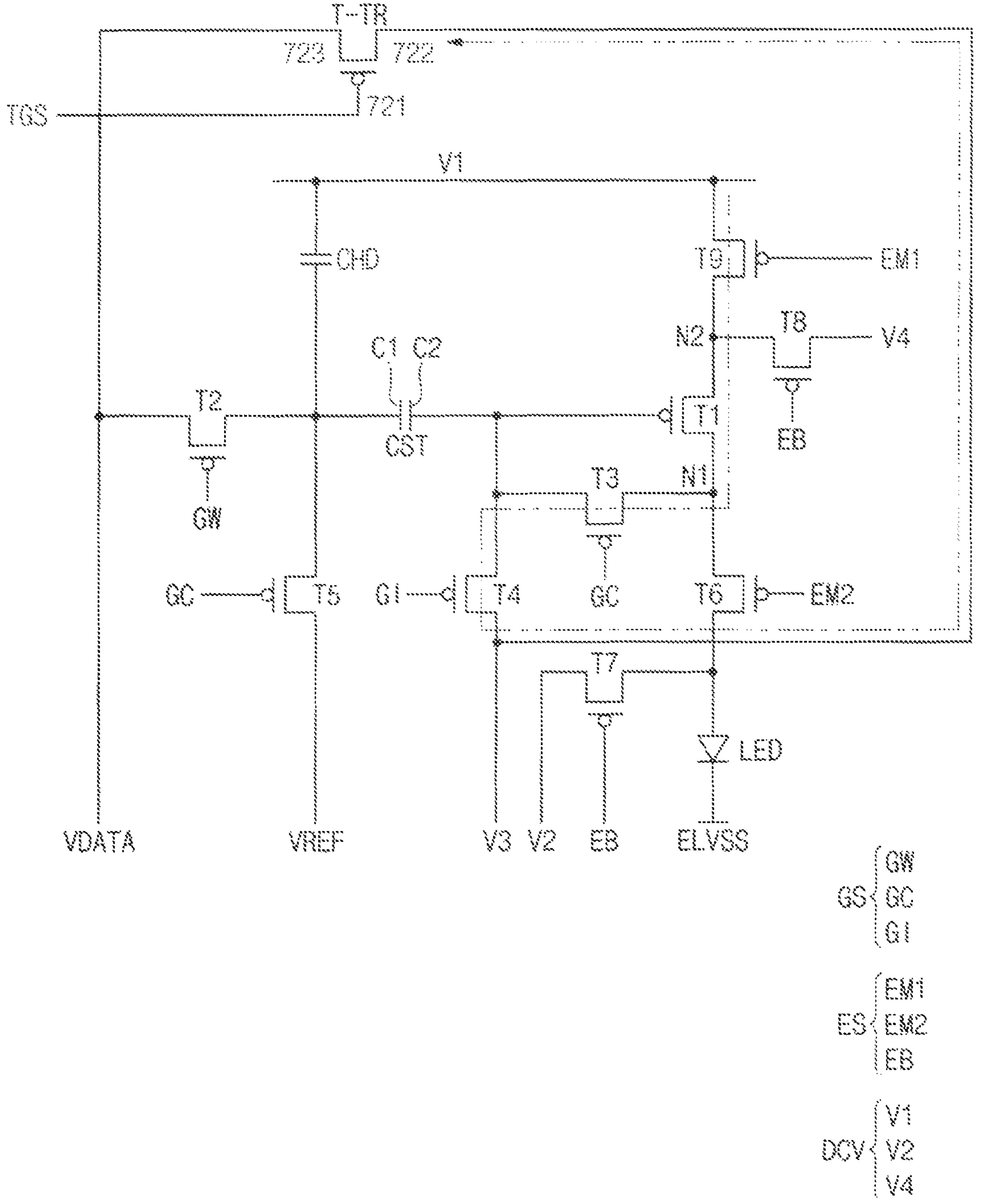
FIGS. 18-20 are circuit diagrams illustrating the display substrate of FIG. 17.
Figure 19:
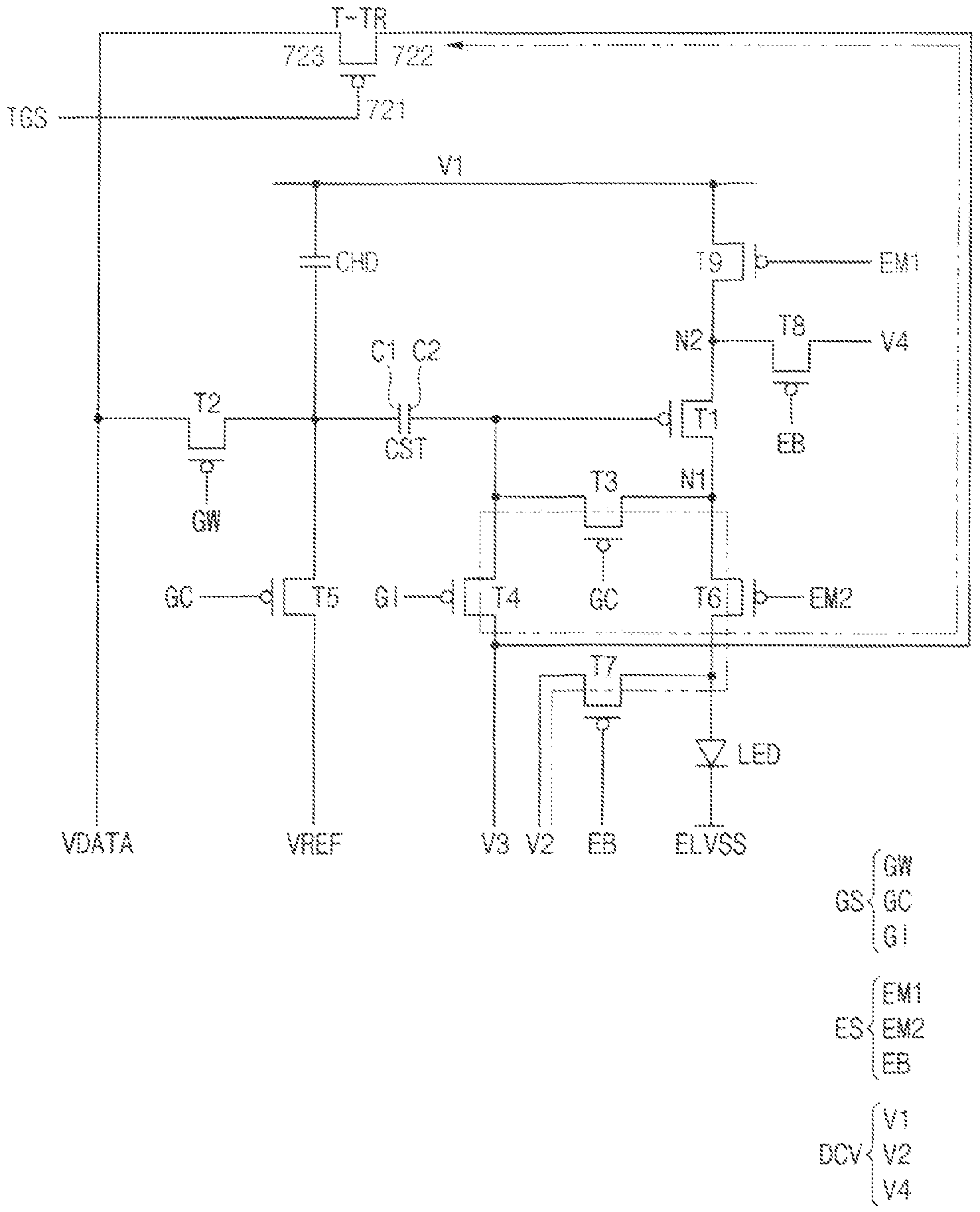
Figure 20:
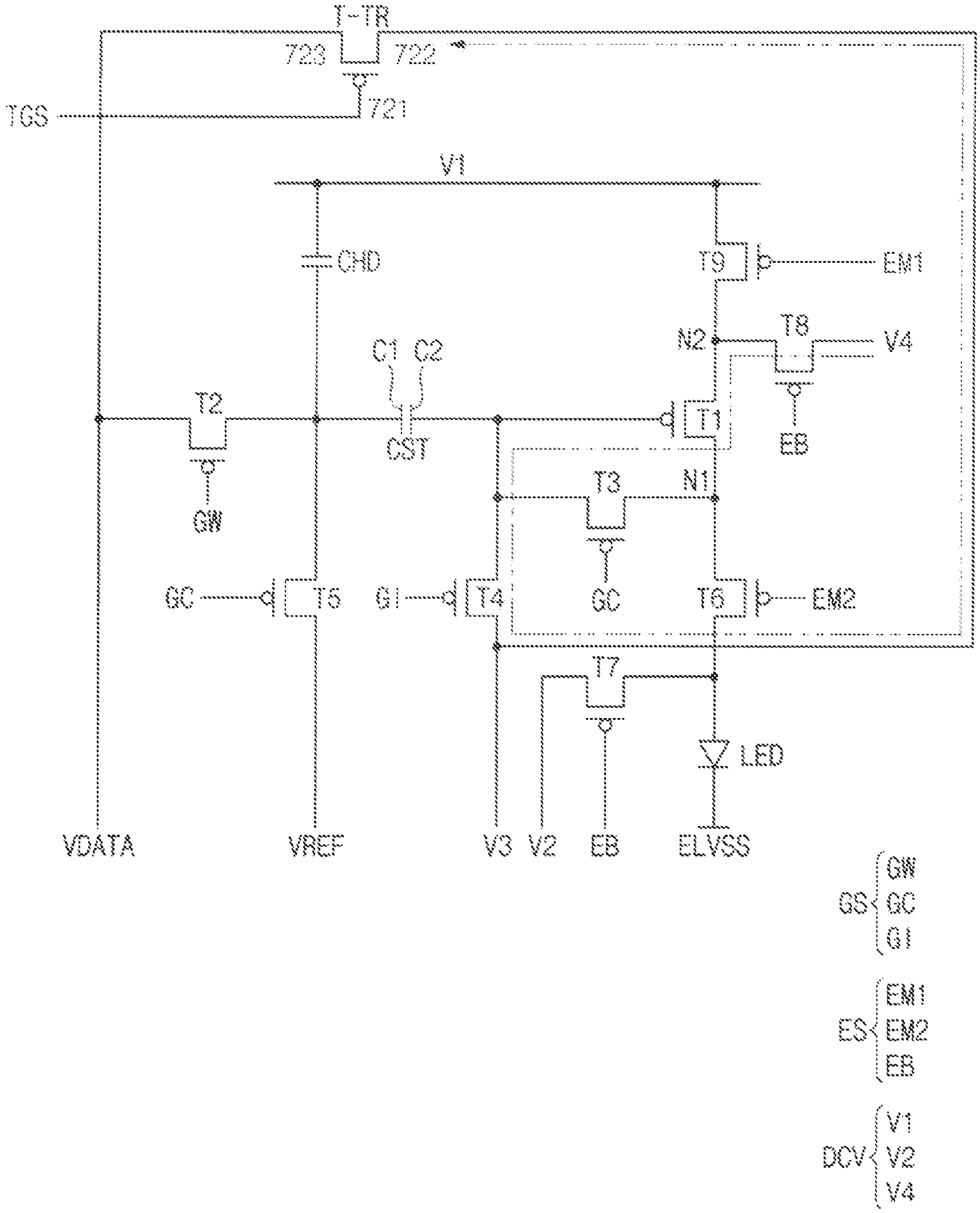

FIGS. 18 through 20 are circuit diagrams illustrating the display substrate of FIG. 17.

Referring to FIG. 18, the array test for the ninth transistor T9, the first transistor T1, the third transistor T3, and the fourth transistor T4 may be performed using the first voltage V1. In other words, the first voltage V1 may be transferred to the test source terminal 722 through the ninth transistor T9, the second node N2, the first transistor T1, the first node N1, the third transistor T3, the fourth transistor T4, and the third voltage line VL3.

In an embodiment, the voltage level of the first voltage V1 may be greater than the voltage level of the third voltage V3. Accordingly, the test source voltage V3' may be transferred to the test source terminal 722. For example, the test source voltage V3' may correspond to a voltage difference between the first voltage V1 and the third voltage V3.

Referring to FIG. 19, the array test for the seventh transistor T7, the sixth transistor T6, the third transistor T3, and the fourth transistor T4 may be performed using the second voltage V2. In other words, the second voltage V2 may be transferred to the test source terminal 722 through the seventh transistor T7, the sixth transistor T6, the first node N1, the third transistor T3, the fourth transistor T4, and the third voltage line VL3.

In an embodiment, the voltage level of the second voltage V2 may be greater than the voltage level of the third voltage V3. Accordingly, the test source voltage V3' may be transferred to the test source terminal 722. For example, the test source voltage V3' may correspond to a voltage difference between the second voltage V2 and the third voltage V3.

Referring to FIG. 20, the array test for the eighth transistor T8, the first transistor T1, the third transistor T3, and the fourth transistor T4 may be performed using the fourth voltage V4. In other words, the fourth voltage V4 may be transferred to the test source terminal 722 through the eighth transistor T8, the second node N2, the first transistor T1, the first node N1, the third transistor T3, the fourth transistor T4, and the third voltage line VL3.

In an embodiment, the voltage level of the fourth voltage V4 may be greater than the voltage level of the third voltage V3. Accordingly, the test source voltage V3' may be transferred to the test source terminal 722. For example, the test source voltage V3' may correspond to a voltage difference between the fourth voltage V4 and the third voltage V3.

Figure 21:
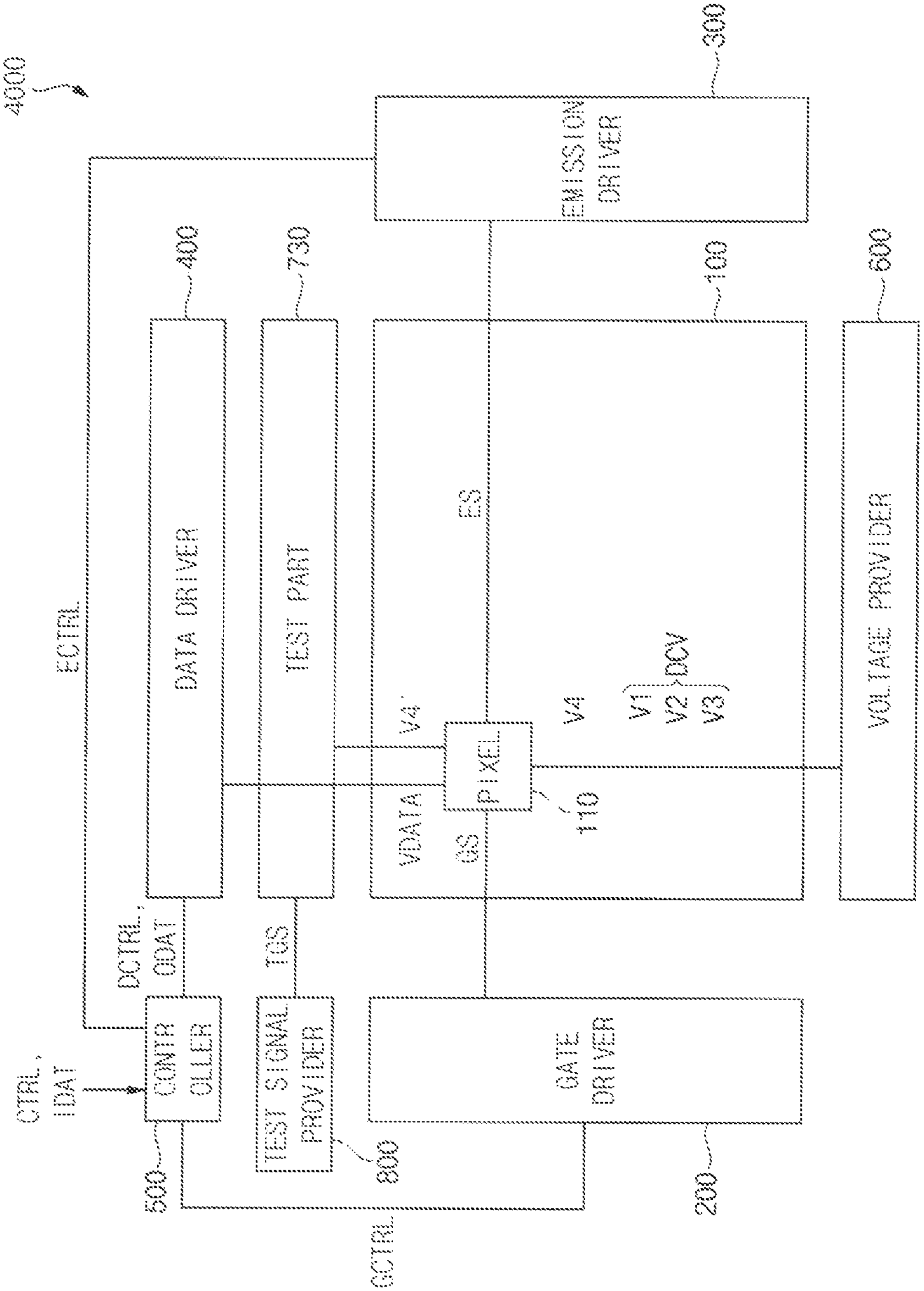
FIG. 21 is a block diagram illustrating a display substrate according to another embodiment.

FIG. 21 is a block diagram illustrating a display substrate according to another embodiment.

Referring to FIG. 21, a display substrate 4000 according to another embodiment may include a display panel 100, a gate driver 200, an emission driver 300, a data driver 400, a controller 500, a voltage provider 600, a test part 730, and a test signal provider 800. The display panel 100 may include at least one pixel circuit 110.

The display substrate 4000 may be the same or substantially the same as (or similar to) the display substrate 1000 described above, except that a connection structure between the pixel circuit 110 and the test part 730 may be different. Accordingly, the differences therebetween may be mainly described hereinafter, and redundant description thereof may be simplified or may not be repeated.

Figure 22:
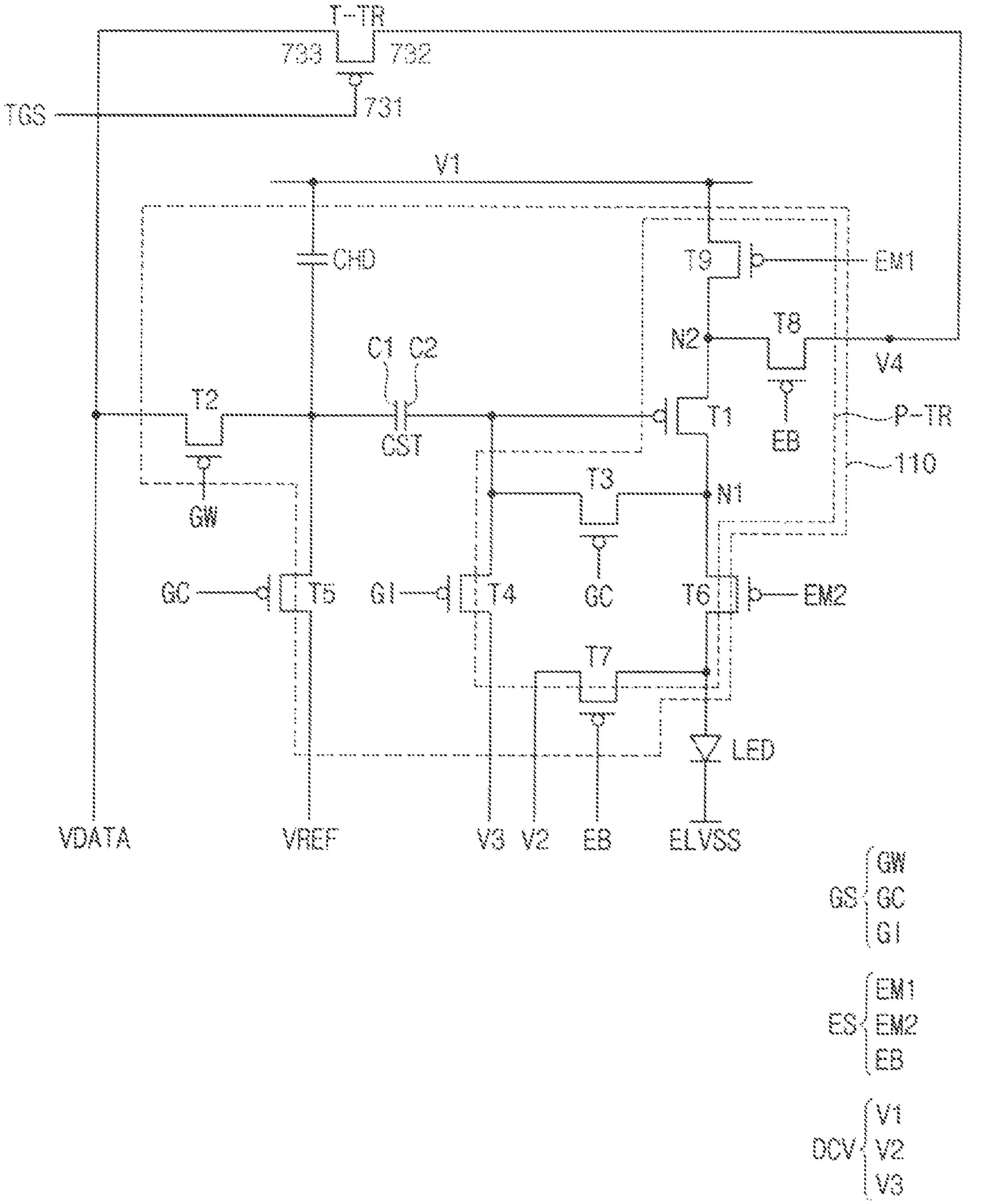
FIG. 22 is a circuit diagram illustrating the display substrate of FIG. 21.

FIG. 22 is a circuit diagram illustrating the display substrate of FIG. 21.

Referring to FIG. 22, the display substrate 4000 may include the pixel circuit 110 and a test transistor T-TR. The pixel circuit 110 may include the compensation capacitor CST, the holding capacitor CHD, the second transistor T2, the fifth transistor T5, and the pixel transistor P-TR. However, the circuit structure of the pixel circuit 110 may be the same or substantially the same as the circuit structure of the pixel circuit 110 described above with reference to FIG. 4.

In an embodiment, the test voltage DCV may include the first voltage V1, the second voltage V2, and the third voltage V3.

The test transistor T-TR may include a test gate terminal 731, a test source terminal 732, and a test drain terminal 733. The test gate terminal 731 may receive the test signal TGS. The test source terminal 732 may be connected to the fourth voltage line VL4 to receive the fourth voltage V4. The test drain terminal 733 may be connected to the data line VDL.

In the case of the display substrate 4000, the array test of the pixel transistor P-TR may be performed through the test transistor T-TR, which may be formed outside the pixel circuit 110. In other words, the array test may be performed on the pixel transistor P-TR that is disconnected from the data line VDL by the compensation capacitor CST. This will be described in more detail below.

Figure 23:
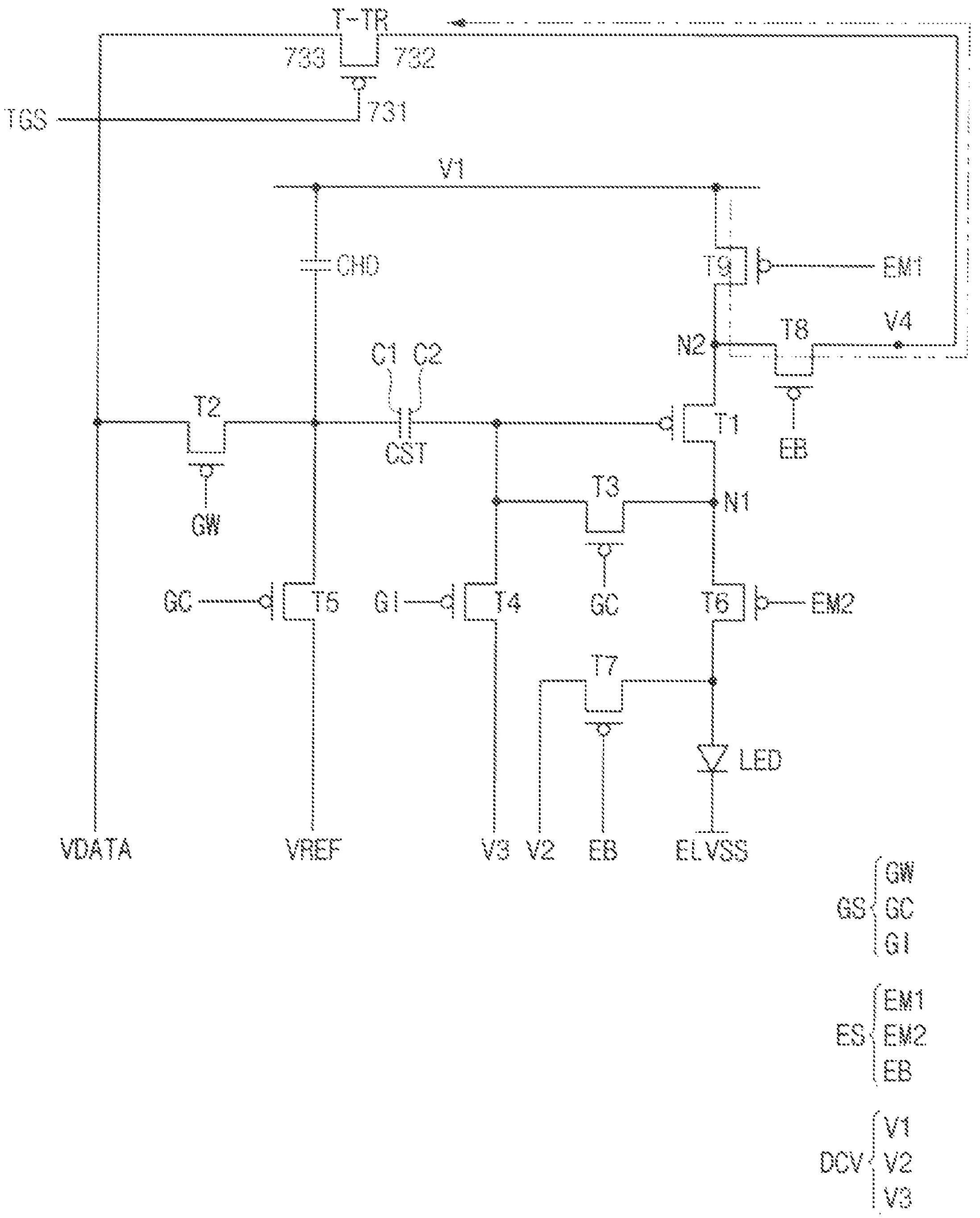
FIGS. 23-25 are circuit diagrams illustrating the display substrate of FIG. 22.
Figure 24:
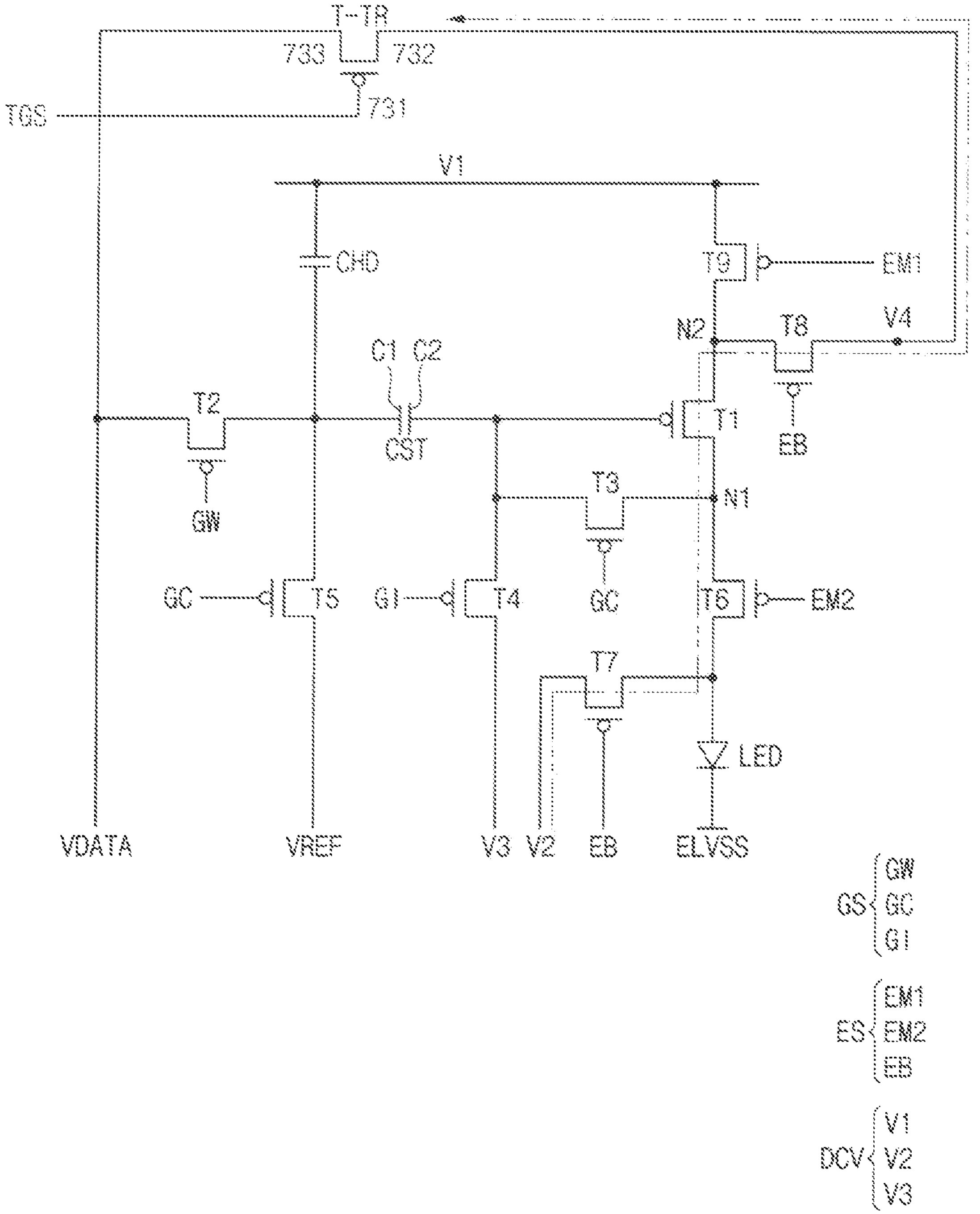
Figure 25:
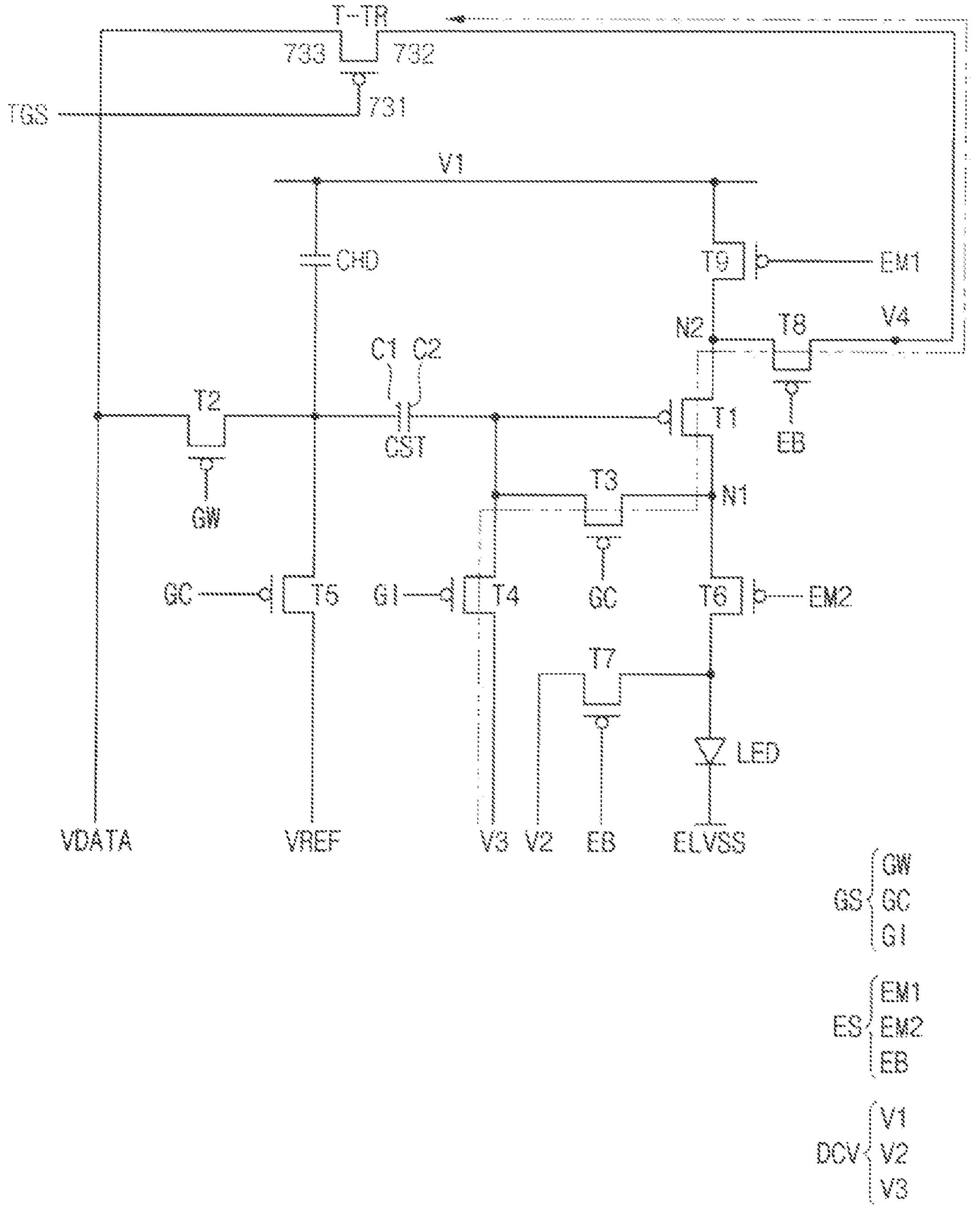

FIGS. 23 through 25 are circuit diagrams illustrating the display substrate of FIG. 22.

Referring to FIG. 23, the array test for the ninth transistor T9 and the eighth transistor T8 may be performed using the first voltage V1. In other words, the first voltage V1 may be transferred to the test source terminal 732 through the ninth transistor T9, the second node N2, the eighth transistor T8, and the fourth voltage line VL4.

In an embodiment, the voltage level of the first voltage V1 may be greater than the voltage level of the fourth voltage V4. Accordingly, the test source voltage V4' may be transferred to the test source terminal 732. For example, the test source voltage V4' may correspond to a voltage difference between the first voltage V1 and the fourth voltage V4.

Referring to FIG. 24, the array test for the seventh transistor T7, the sixth transistor T6, the first transistor T1, and the eighth transistor T8 may be performed using the second voltage V2. In other words, the second voltage V2 may be transferred to the test source terminal 732 through the seventh transistor T7, the sixth transistor T6, the first node N1, the first transistor T1, the second node N2, the eighth transistor T8, and the fourth voltage line VL4.

In an embodiment, the voltage level of the second voltage V2 may be greater than the voltage level of the fourth voltage V4. Accordingly, the test source voltage V4' may be transferred to the test source terminal 732. For example, the test source voltage V4' may correspond to a voltage difference between the second voltage V2 and the fourth voltage V4.

Referring to FIG. 25, the array test for the fourth transistor T4, the third transistor T3, the first transistor T1, and the eighth transistor T8 may be performed using the third voltage V3. In other words, the third voltage V3 may be transferred to the test source terminal 732 through the fourth transistor T4, the third transistor T3, the first node N1, the first transistor T1, the second node N2, the eighth transistor T8, and the fourth voltage line VL4.

In an embodiment, the voltage level of the third voltage V3 may be greater than the voltage level of the fourth voltage V4. Accordingly, the test source voltage V4' may be transferred to the test source terminal 732. For example, the test source voltage V4' may correspond to a voltage difference between the third voltage V3 and the fourth voltage V4.

Figure 26:
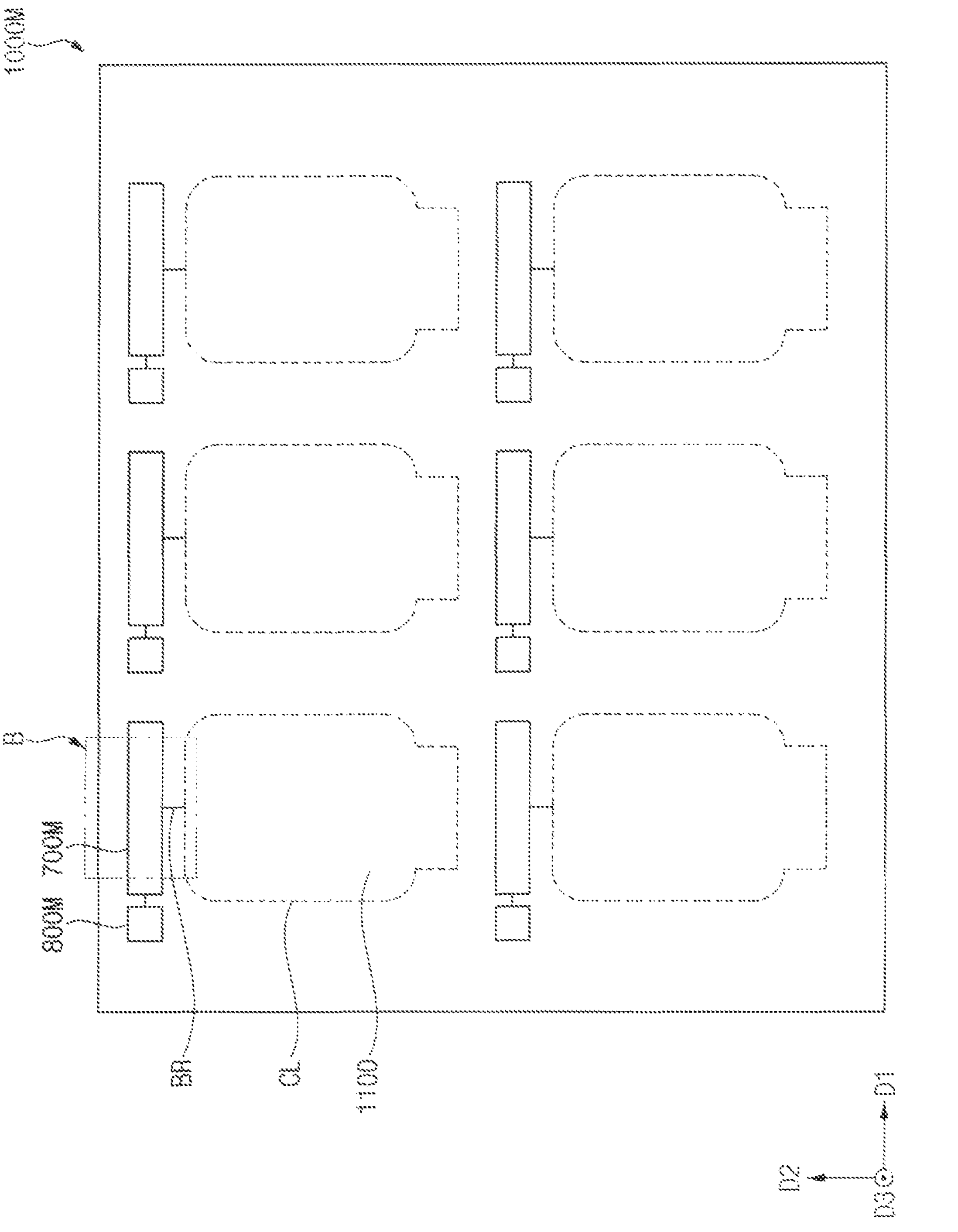
FIG. 26 is a plan view illustrating a mother substrate for a display substrate according to an embodiment.

FIG. 26 is a plan view illustrating a mother substrate for a display substrate according to an embodiment.

Referring to FIG. 26, a mother substrate 1000M for a display substrate according to an embodiment may include a display substrate 1100, a test part 700M, and a test signal provider 800M.

The mother substrate 1000M for a display substrate may include a plurality of display substrates. After the array test is performed on the display substrates, the display substrates may be manufactured by cutting the display substrates.

In order to perform an array test on the display substrates, a test part and a test signal provider may be provided for each of the display substrates.

In an embodiment, the display substrate 1100 may be formed within (e.g., inside) a cutting line CL. The test part 700M and the test signal provider 800M may be formed outside the cutting line CL. The test part 700M may be electrically connected to the display substrate 1100 through a bridge pattern BR.

Figure 27:
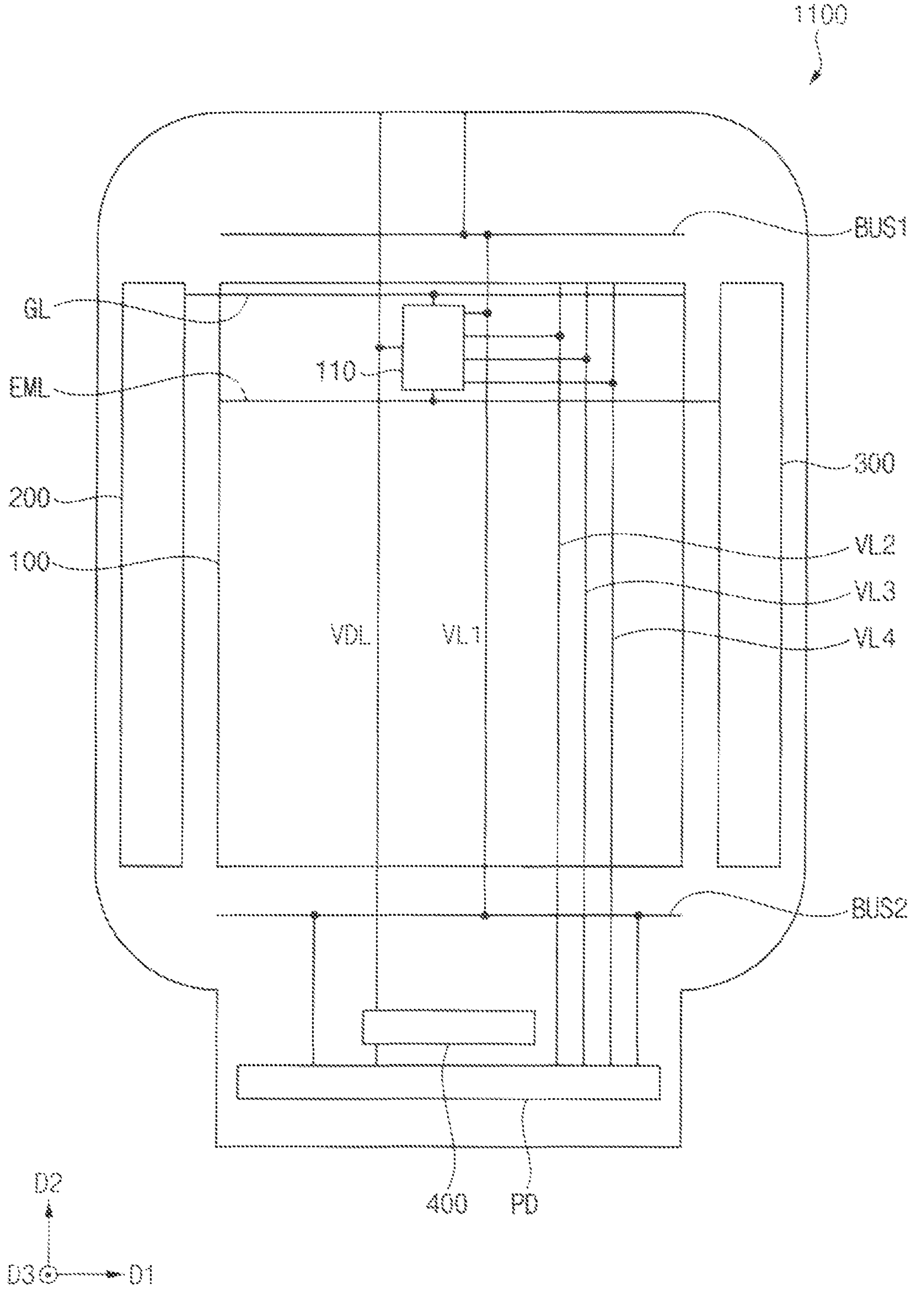
FIG. 27 is a plan view illustrating a display substrate included in the mother substrate of FIG. 26.

FIG. 27 is a plan view illustrating a display substrate included in the mother substrate of FIG. 26.

Referring to FIG. 27, the display substrate 1100 may include a display panel 100, a gate driver 200, an emission driver 300, and a data driver 400. However, the display substrate 1100 may be the same or substantially the same as the display substrate 1000 described above with reference to FIG. 2, except that the test part and the test signal provider are not included. In other words, as the test part 700M and the test signal provider 800M are formed outside the cutting line CL, the test part 700M and the test signal provider 800M may not be formed within (e.g., inside) the display substrate 1100.

Figure 28:
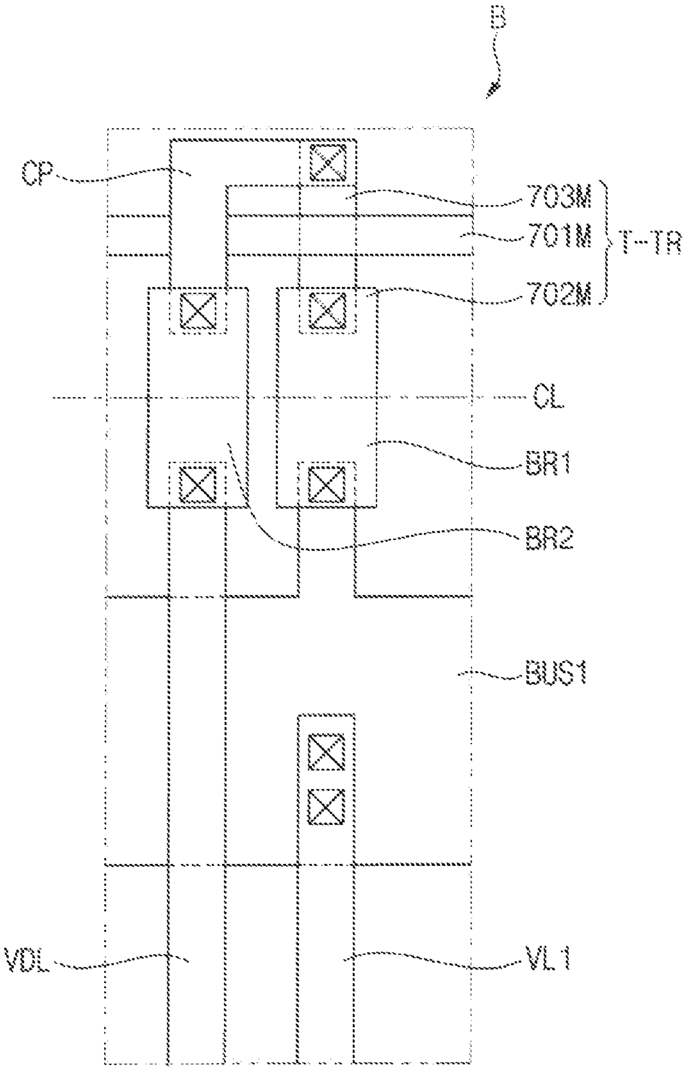
FIG. 28 is an enlarged view of the area B of FIG. 26.

FIG. 28 is an enlarged view of the area B of FIG. 26.

Referring to FIG. 28, a test transistor T-TR included in the test part 700M may include a test gate terminal 701M, a test source terminal 702M, and a test drain terminal 703M. The test gate terminal 701M may be connected to the test signal provider 800M. The test source terminal 702M may be connected to the first voltage bus BUS1 through a first bridge pattern BR1. The test drain terminal 703M may be connected to the data line VDL through a connection pattern CP and a second bridge pattern BR2. The test transistor T-TR may be turned on or off in response to a test signal provided to the test gate terminal 701M. Accordingly, the test part 700M including the test transistor T-TR may perform the array test.

In an embodiment, the first bridge pattern BR1 and the second bridge pattern BR2 may be formed of a metal, an alloy, a conductive metal oxide, a transparent conductive material, or the like. Examples of the materials that may be used as the first and second bridge patterns BR1 and BR2 may include silver ("Ag"), an alloy containing silver, molybdenum ("Mo"), an alloy containing molybdenum. aluminum ("Al"), an alloy containing aluminum, aluminum nitride ("AlN"), tungsten ("W"), tungsten nitride ("WN"), copper ("Cu"), nickel ("Ni"), chromium ("Cr"), chromium nitride ("CrN"), titanium ("Ti"), tantalum ("Ta"), platinum ("Pt"), scandium ("Sc"), indium tin oxide ("ITO"), indium zinc oxide ("IZO"), and/or the like. These materials may be used alone or in combination with each other.

In an embodiment, when the first and second bridge patterns BR1 and BR2 are formed of a conductive metal oxide (e.g., indium tin oxide ("ITO"), indium zinc oxide ("IZO"), and/or the like), the first and second bridge patterns BR1 and BR2 may be resistant to corrosion. Accordingly, even when the first and second bridge patterns BR1 and BR2 are cut along (e.g., on) the cutting line CL, the first and second bridge patterns BR1 and BR2 may not be corroded.

In an embodiment, the first and second bridge patterns BR1 and BR2 may include an oxide semiconductor material. Examples of the oxide semiconductor material may include IGZO (InGaZnO), ITZO (InSnZnO), and/or the like.

In addition, in order to prevent or substantially prevent a short circuit between the first bridge pattern BR1 and the second bridge pattern BR2 during the cutting process, the first bridge pattern BR1 and the second bridge pattern BR2 may be covered by an insulating layer.

Figure 29:
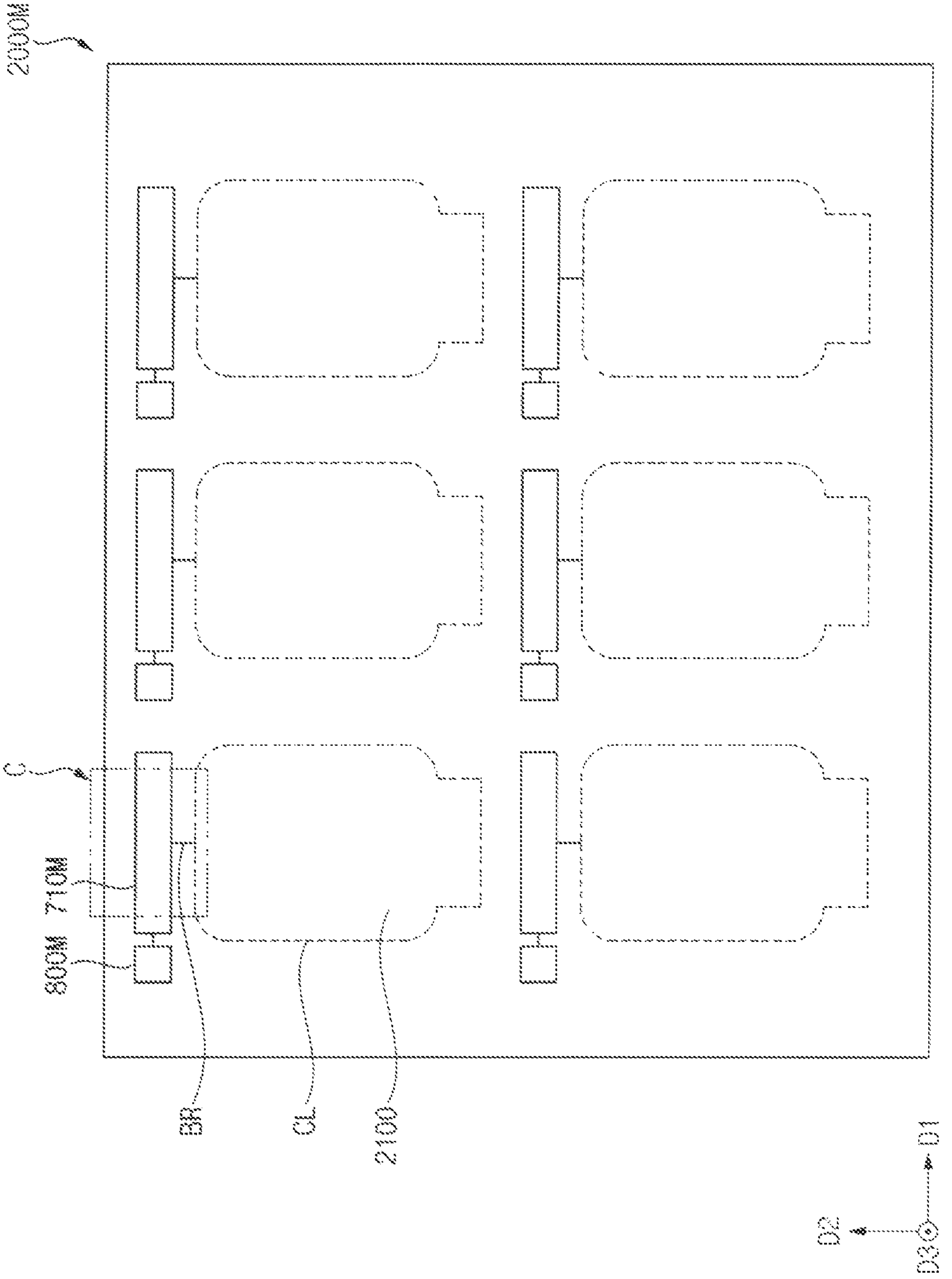
FIG. 29 is a plan view illustrating a mother substrate for a display substrate according to another embodiment.

FIG. 29 is a plan view illustrating a mother substrate for a display substrate according to another embodiment.

Referring to FIG. 29, a mother substrate 2000M for a display substrate according to another embodiment may include a display substrate 2100, a test part 710M, and an test signal provider 800M.

In an embodiment, the display substrate 2100 may be formed within (e.g., inside) the cutting line CL. The test part 710M and the test signal provider 800M may be formed outside the cutting line CL. The test part 710M may be electrically connected to the display substrate 2100 through a bridge pattern BR.

Figure 30:
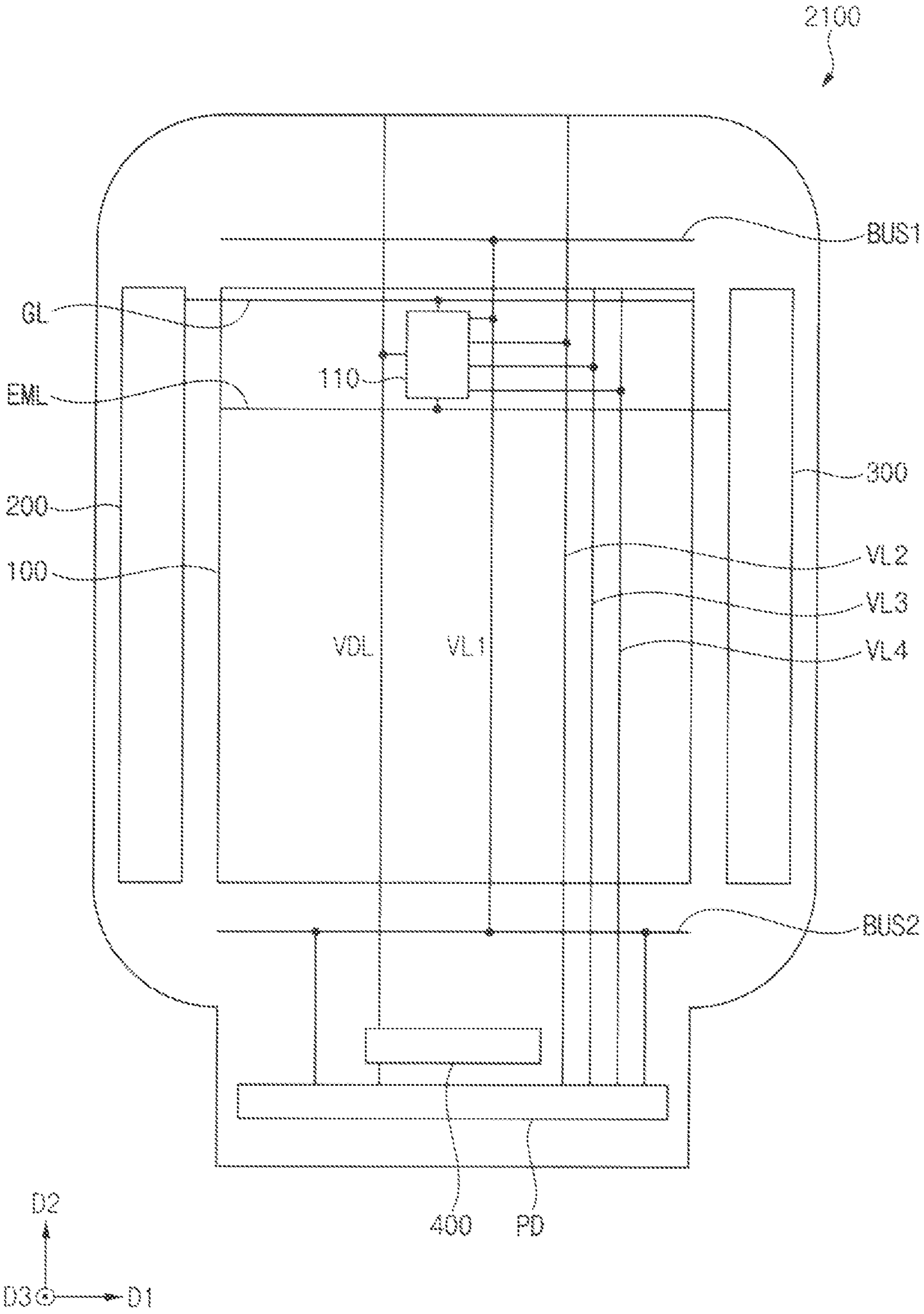
FIG. 30 is a plan view illustrating a display substrate included in the mother substrate of FIG. 29.

FIG. 30 is a plan view illustrating a display substrate included in the mother substrate of FIG. 29.

Referring to FIG. 30, the display substrate 2100 may include a display panel 100, a gate driver 200, an emission driver 300, and a data driver 400. However, the display substrate 2100 may be the same or substantially the same as the display substrate 1100 described above with reference to FIG. 27, except for a first voltage line VL1 and a second voltage line VL2 may be different. In an embodiment, the first voltage line VL1 may not extend to the cutting line CL, and the second voltage line VL2 may extend to the cutting line CL.

Figure 31:
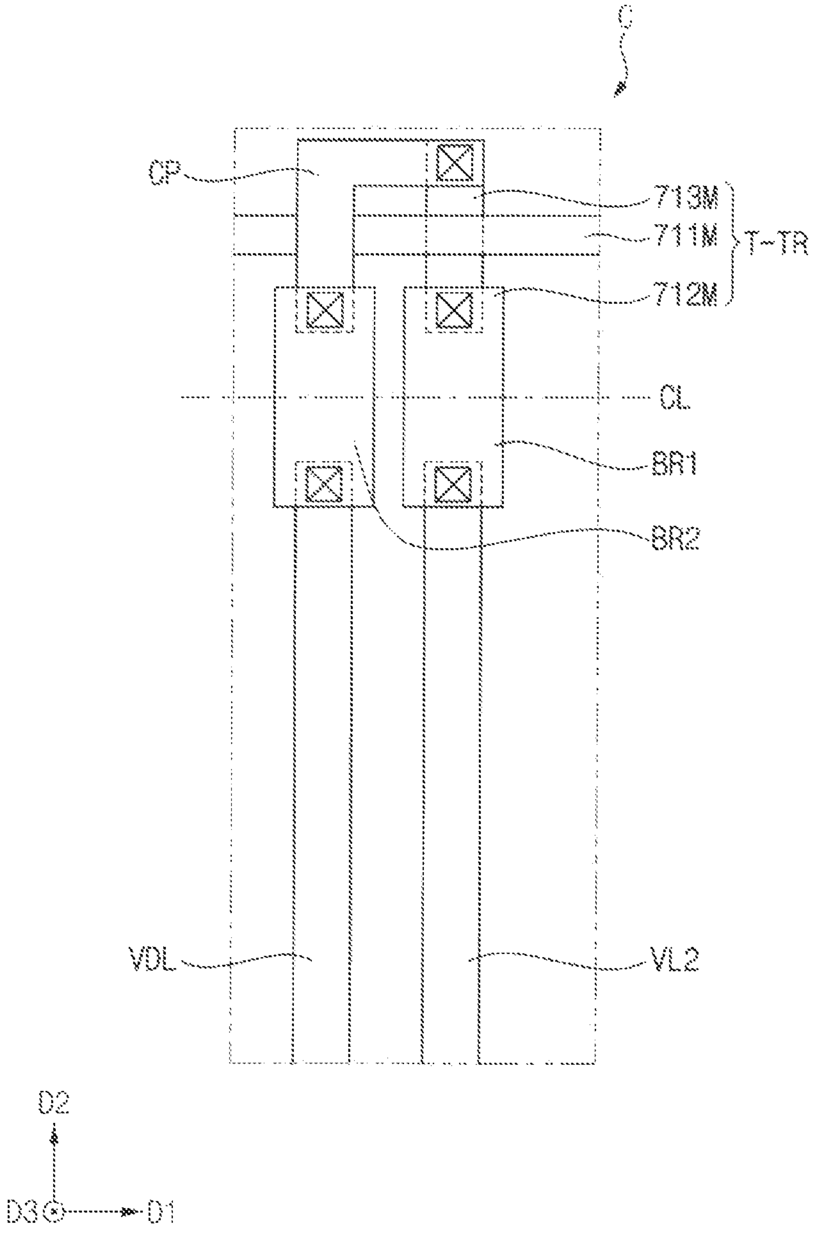
FIG. 31 is an enlarged view of the area C of FIG. 29.

FIG. 31 is an enlarged view of the area C of FIG. 29.

Referring to FIG. 31, the test transistor T-TR included in the test part 710M may include a test gate terminal 711M, a test source terminal 712M, and a test drain terminal 713M. The test gate terminal 711M may be connected to the test signal provider 800M. The test source terminal 712M may be connected to the second voltage line VL2 through a first bridge pattern BR1. The test drain terminal 713M may be connected to the data line VDL through a connection pattern CP and a second bridge pattern BR2. The test transistor T-TR may be turned on or off in response to a test signal provided to the test gate terminal 711M. Accordingly, the test part 710M including the test transistor T-TR may perform the array test.

Figure 32:
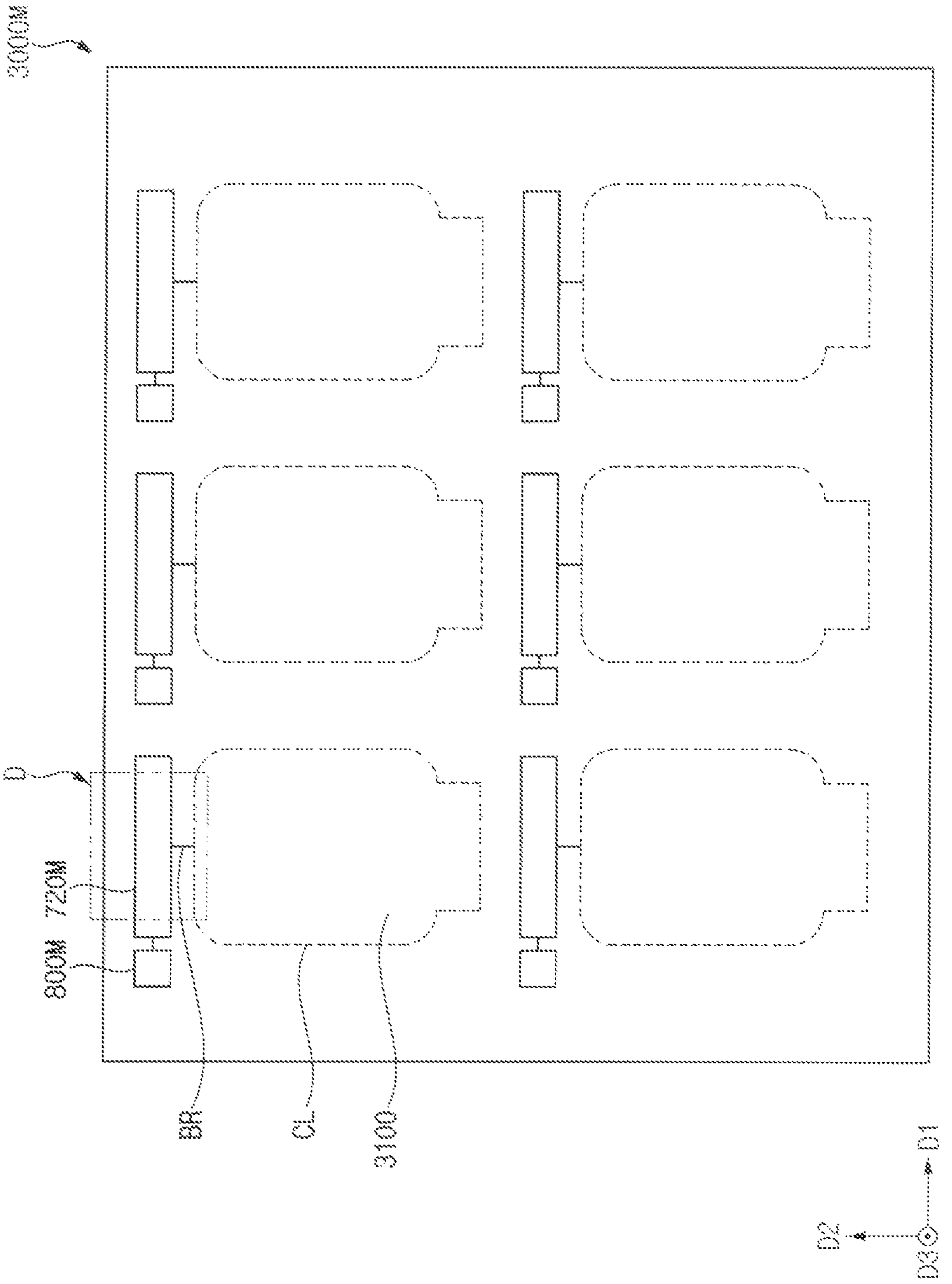
FIG. 32 is a plan view illustrating a mother substrate for a display substrate according to another embodiment.

FIG. 32 is a plan view illustrating a mother substrate for a display substrate according to another embodiment.

Referring to FIG. 32, a mother substrate 3000M for a display substrate according to another embodiment may include a display substrate 3100, a test part 720M, and a test signal provider 800M.

In an embodiment, the display substrate 3100 may be formed within (e.g., inside) the cutting line CL. The test part 720M and the test signal provider 800M may be formed outside the cutting line CL. The test part 720M may be electrically connected to the display substrate 3100 through a bridge pattern BR.

Figure 33:
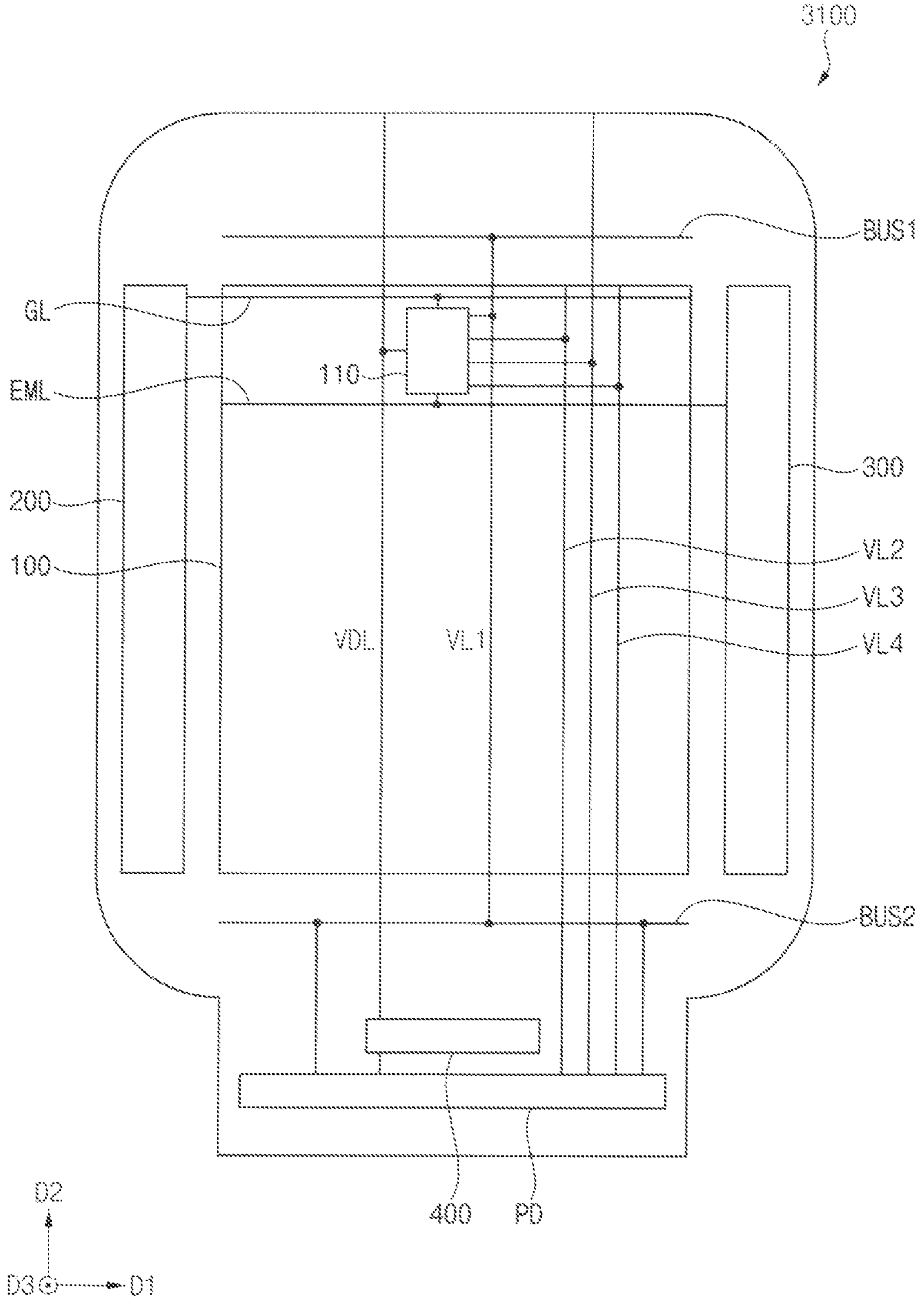
FIG. 33 is a plan view illustrating a display substrate included in the mother substrate of FIG. 32.

FIG. 33 is a plan view illustrating a display substrate included in the mother substrate of FIG. 32.

Referring to FIG. 33, the display substrate 3100 may include a display panel 100, a gate driver 200, an emission driver 300, and a data driver 400. However, the display substrate 3100 may be the same or substantially the same as the display substrate 1100 described above with reference to FIG. 27, except for a first voltage line VL1 and a third voltage line VL3 may be different. In an embodiment, the first voltage line VL1 may not extend to the cutting line CL, and the third voltage line VL3 may extend to the cutting line CL.

Figure 34:
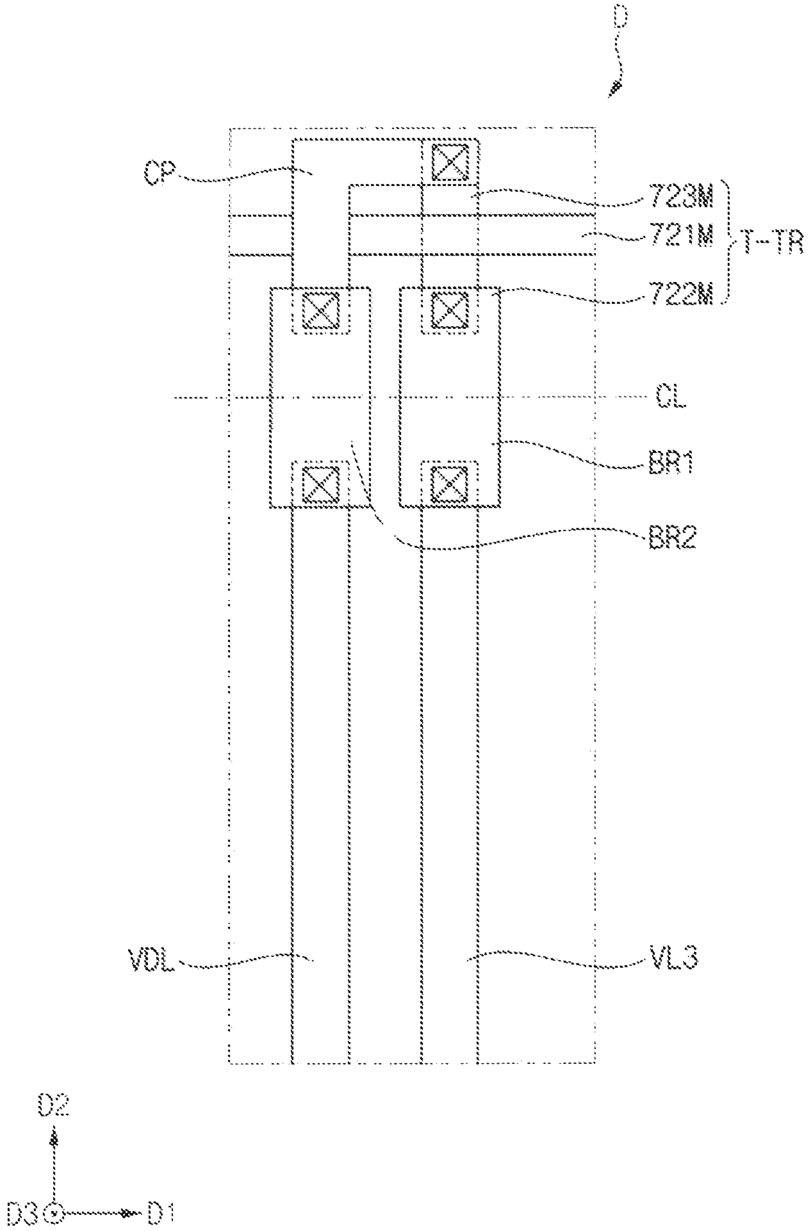
FIG. 34 is an enlarged view of the area D of FIG. 32.

FIG. 34 is an enlarged view of the area D of FIG. 32.

Referring to FIG. 34, a test transistor T-TR included in the test part 720M may include a test gate terminal 721M, a test source terminal 722M, and a test drain terminal 723M. The test gate terminal 721M may be connected to the test signal provider 800M. The test source terminal 722M may be connected to the third voltage line VL3 through a first bridge pattern BR1. The test drain terminal 723M may be connected to the data line VDL through a connection pattern CP and a second bridge pattern BR2. The test transistor T-TR may be turned on or off in response to a test signal provided to the test gate terminal 721M. Accordingly, the test part 720M including the test transistor T-TR may perform the array test.

Figure 35:
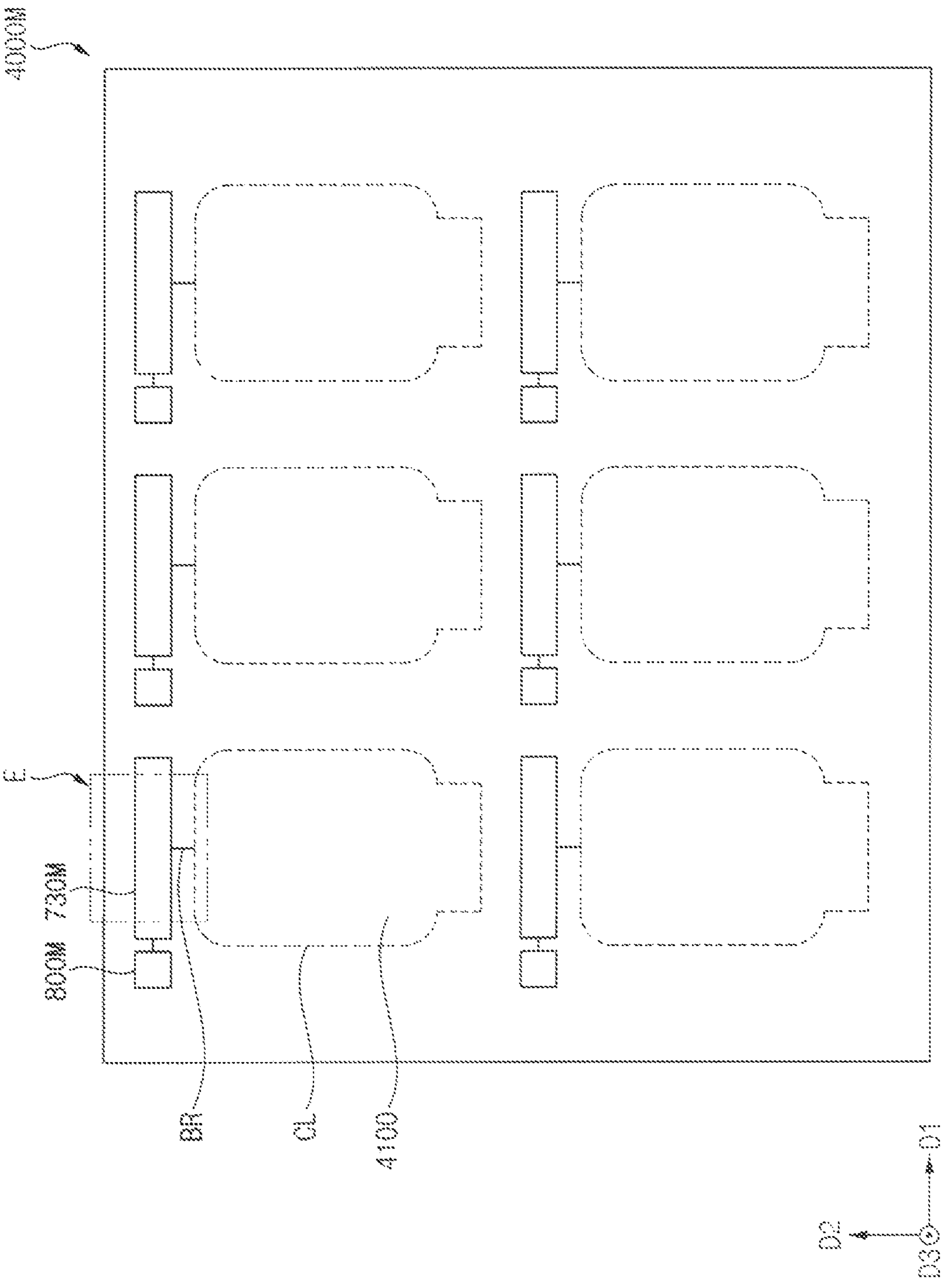
FIG. 35 is a plan view illustrating a mother substrate for a display substrate according to another embodiment.

FIG. 35 is a plan view illustrating a mother substrate for a display substrate according to another embodiment.

Referring to FIG. 35, a mother substrate 4000M for a display substrate according to another embodiment may include a display substrate 4100, a test part 730M, and a test signal provider 800M.

In an embodiment, the display substrate 4100 may be formed within (e.g., inside) the cutting line CL. The test part 730M and the test signal provider 800M may be formed outside the cutting line CL. The test part 730M may be electrically connected to the display substrate 4100 through a bridge pattern BR.

Figure 36:
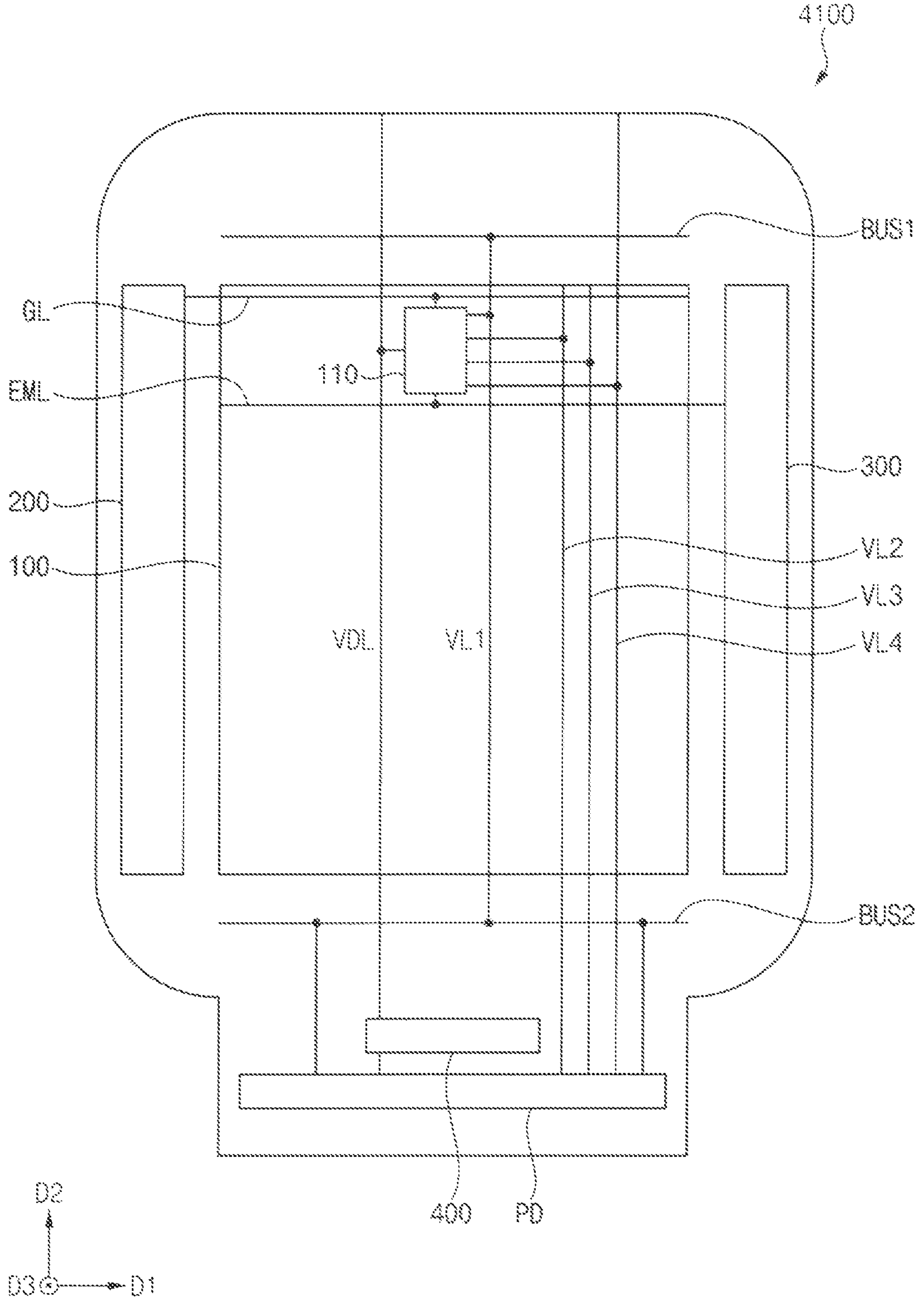
FIG. 36 is a plan view illustrating a display substrate included in the mother substrate of FIG. 35.

FIG. 36 is a plan view illustrating a display substrate included in the mother substrate of FIG. 35.

Referring to FIG. 36, the display substrate 4100 may include a display panel 100, a gate driver 200, an emission driver 300, and a data driver 400. However, the display substrate 4100 may be the same or substantially the same as the display substrate 1100 described above with reference to FIG. 27, except for a first voltage line VL1 and a fourth voltage line VL4 may be different. In an embodiment, the first voltage line VL1 may not extend to the cutting line CL, and the fourth voltage line VL4 may extend to the cutting line CL.

Figure 37:
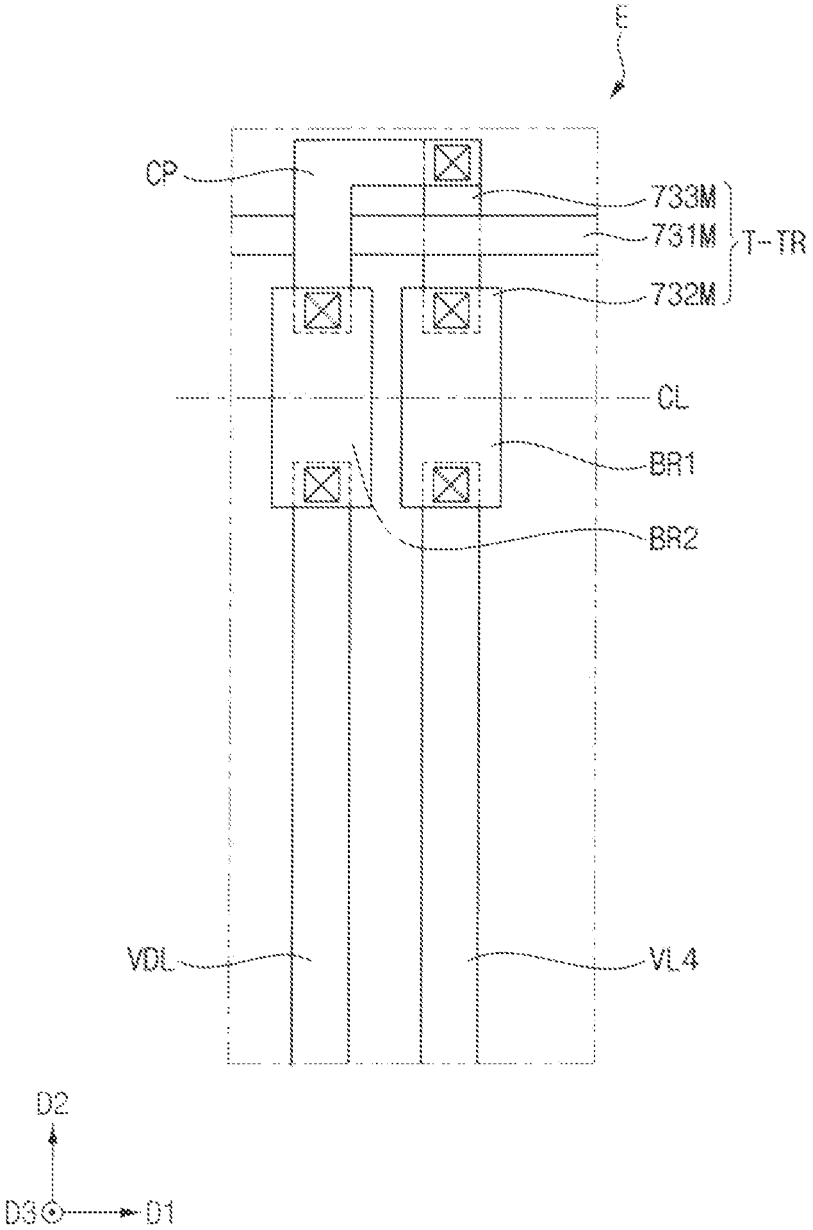
FIG. 37 is an enlarged view of the area E of FIG. 35.

FIG. 37 is an enlarged view of the area E of FIG. 35.

Referring to FIG. 37, a test transistor T-TR included in the test part 730M may include a test gate terminal 731M, a test source terminal 732M, and a test drain terminal 733M. The test gate terminal 731M may be connected to the test signal provider 800M. The test source terminal 732M may be connected to the fourth voltage line VL4 through a first bridge pattern BR1. The test drain terminal 733M may be connected to the data line VDL through a connection pattern CP and a second bridge pattern BR2. The test transistor T-TR may be turned on or off in response to a test signal provided to the test gate terminal 731M. Accordingly, the test part 730M including the test transistor T-TR may perform the array test.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A mother substrate, comprising:

a display substrate located within a cutting line of the mother substrate;

a test part located outside the cutting line, and electrically connected to the display substrate through a bridge pattern, wherein the bridge pattern passes through the cutting line; and a test signal provider located outside the cutting line, and electrically connected to the test part, wherein the test part comprises a test transistor located outside the cutting line, wherein the display substrate comprises a pixel circuit comprising:

a switching transistor connected between a first terminal of a compensation capacitor and a data line; and a pixel transistor connected between a second terminal of the compensation capacitor and a first voltage line, the pixel transistor being configured to receive a test voltage, wherein the test transistor comprises:

a test gate terminal configured to receive a test signal;

a test source terminal electrically connected to the first voltage line; and a test drain terminal electrically connected to the data line, and wherein the test transistor is configured to be separated from the data line when the cutting line is cut.

2. The mother substrate of claim 1, wherein the test gate terminal is connected to the test signal provider, and is configured to receive the test signal from the test signal provider.

3. The mother substrate of claim 1, wherein the bridge pattern comprises:

a first bridge pattern electrically connecting the test source terminal to the first voltage line; and a second bridge pattern electrically connecting the test drain terminal to the data line.

4. The mother substrate of claim 1, wherein the bridge pattern comprises a conductive metal oxide.

5. The mother substrate of claim 1, wherein, when a voltage level of the test voltage changes, a voltage level of a voltage received by the test source terminal changes.

6. The mother substrate of claim 1, wherein a voltage level of the test voltage is greater than a voltage level of a first voltage of the first voltage line.

7. The mother substrate of claim 1, further comprising a first voltage bus connected to the first voltage line, wherein the test source terminal is directly connected to the first voltage bus.

8. The mother substrate of claim 7, wherein the first voltage bus is located between the pixel circuit and the test transistor.

9. The mother substrate of claim 1, wherein the pixel transistor comprises a first transistor comprising a source terminal connected to the first voltage line through a first node, and a drain terminal connected to a second node, and wherein the test voltage includes a second voltage, and the test source terminal is configured to receive the second voltage through the second node, the first node, and the first voltage line.

10. The mother substrate of claim 9, wherein the pixel transistor further comprises:

a sixth transistor connected to the first node; and a seventh transistor connected to the sixth transistor, and wherein the test voltage further includes a third voltage, and the test source terminal is configured to receive the third voltage through the seventh transistor, the sixth transistor, the first node, and the first voltage line.

11. The mother substrate of claim 10, wherein the pixel transistor further comprises an eighth transistor connected to the second node, and wherein the test voltage further includes a fourth voltage, and the test source terminal is configured to receive the fourth voltage through the eighth transistor, the second node, the first node, and the first voltage line.

12. A mother substrate, comprising:
a display substrate located within a cutting line of the mother substrate;
a test part located outside the cutting line, and electrically connected to the display substrate through a bridge pattern, wherein the bridge pattern passes through the cutting line; and
a test signal provider located outside the cutting line, and electrically connected to the test part,
wherein the test part comprises a test transistor located outside the cutting line,
wherein the display substrate comprises a pixel circuit comprising:
a switching transistor connected between a first terminal of a compensation capacitor and a data line; and
a pixel transistor connected between a second terminal of the compensation capacitor and a first voltage line, the pixel transistor being configured to receive a test voltage,
wherein the test transistor comprises:
a test gate terminal configured to receive a test signal;
a test source terminal electrically connected to the first voltage line; and
a test drain terminal electrically connected to the data line,
wherein the pixel transistor comprises a first transistor comprising a source terminal connected to a first node, and a drain terminal connected to the first voltage line through a second node, and
wherein the test voltage includes a second voltage, and the test source terminal is configured to receive the second voltage through the first node, the second node, and the first voltage line.

13. The mother substrate of claim 12, wherein the pixel transistor further comprises:
a sixth transistor connected to the first node;
a seventh transistor connected to the sixth transistor; and
a ninth transistor connected between the second node and the first voltage line.

14. The mother substrate of claim 12, wherein the pixel transistor further comprises:
a third transistor connected to the first node; and
a fourth transistor connected to the third transistor, and
wherein the test voltage further includes a third voltage, and the test source terminal is configured to receive the third voltage through the fourth transistor, the third transistor, the first node, the second node, and the first voltage line.

15. The mother substrate of claim 14, wherein the pixel transistor further comprises an eighth transistor connected to the second node, and
wherein the test voltage further includes a fourth voltage, and the test source terminal is configured to receive the fourth voltage through the eighth transistor, the second node, and the first voltage line.

16. A mother substrate, comprising:
a display substrate located within a cutting line of the mother substrate;
a test part located outside the cutting line, and electrically connected to the display substrate through a bridge pattern, wherein the bridge pattern passes through the cutting line; and
a test signal provider located outside the cutting line, and electrically connected to the test part,
wherein the test part comprises a test transistor located outside the cutting line,
wherein the display substrate comprises a pixel circuit comprising:
a switching transistor connected between a first terminal of a compensation capacitor and a data line; and
a pixel transistor connected between a second terminal of the compensation capacitor and a first voltage line, the pixel transistor being configured to receive a test voltage,
wherein the test transistor comprises:
a test gate terminal configured to receive a test signal;
a test source terminal electrically connected to the first voltage line; and
a test drain terminal electrically connected to the data line,
wherein the pixel transistor comprises a first transistor comprising a source terminal connected to a first node, and a drain terminal connected to the first voltage line through a second node, and
wherein the test voltage includes a second voltage, and the test source terminal is configured to receive the second voltage through the second node, the first node, and the first voltage line.

17. The mother substrate of claim 16, wherein the pixel transistor further comprises:
a third transistor connected to the first node; and
a fourth transistor connected to the third transistor, and
wherein the test voltage further includes a third voltage, and the test source terminal is configured to receive the third voltage through the fourth transistor, the third transistor, the first node, and the first voltage line.

18. The mother substrate of claim 17, wherein the pixel transistor further comprises an eighth transistor connected to the second node, and
wherein the test voltage further includes a fourth voltage, and the test source terminal is configured to receive the fourth voltage through the eighth transistor, the second node, the first node, and the first voltage line.

* * * * *